United States Patent
Taki et al.

(10) Patent No.: US 7,599,721 B2
(45) Date of Patent: Oct. 6, 2009

(54) MOBILE TERMINAL DEVICE INCLUDING AN ELEVATING KEYBOARD MECHANISM

(75) Inventors: Shunsuke Taki, Tokyo (JP); Toru Amano, Tokyo (JP); Yoshikazu Iino, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 322 days.

(21) Appl. No.: 11/227,113

(22) Filed: Sep. 16, 2005

(65) Prior Publication Data

US 2006/0053847 A1 Mar. 16, 2006

(30) Foreign Application Priority Data

Sep. 16, 2004 (JP) .............................. 2004-270415

(51) Int. Cl.
*H04M 1/00* (2006.01)
(52) U.S. Cl. ................. 455/575.1; 455/575.4; 455/90.3; 455/575.3; 361/535; 361/517; 70/158; 70/224
(58) Field of Classification Search .............. 455/575.4, 455/90.3, 574.3; 361/680, 683, 535, 224; 70/158, 224
See application file for complete search history.

(56) References Cited

U.S. PATENT DOCUMENTS

| | | | | |
|---|---|---|---|---|
| 6,782,242 | B1 * | 8/2004 | Koleda et al. ............... | 455/90.3 |
| 6,853,543 | B1 * | 2/2005 | Moore et al. ................. | 361/680 |
| 2001/0036266 | A1 * | 11/2001 | Gronroos et al. ........ | 379/433.01 |
| 2004/0085739 | A1 * | 5/2004 | Lee et al. ..................... | 361/727 |
| 2005/0153728 | A1 * | 7/2005 | Ronkko .................... | 455/550.1 |
| 2005/0265545 | A1 * | 12/2005 | Lonka et al. ............ | 379/433.08 |

(Continued)

FOREIGN PATENT DOCUMENTS

EP 0 944 219 A2 9/1999

(Continued)

OTHER PUBLICATIONS

Electronic translation of JP 2003-058299 to Watabe Tadasu, publication date Feb. 28, 2003.*

(Continued)

*Primary Examiner*—Rafael Pérez-Gutiérrez
*Assistant Examiner*—Nimesh Patel
(74) *Attorney, Agent, or Firm*—Oblon, Spivak, McClelland, Maier & Neustadt, L.L.P.

(57) ABSTRACT

Disclosed is a novel mobile phone wherein a one-push open/close mechanism slideably intercoupling upper and lower housings causes a tension of a spring member to function for sliding movements of the upper and lower housings along an open direction in an opening event, and inverts the tension of the spring member for the sliding movements of the upper and lower housings along a close direction in a closing event. An elevation mechanism operates in association with the sliding movement of the upper housing to perform ascending control of a key operation section in the opening event, and operates in association with the sliding movement of the upper housing to perform descending control of the key operation section in the closing event. Thereby, the mobile phone can be set by a one-push operation to an open state or closed state. In the opening event, the key operation section automatically ascends; and in the closing event, the key operation section automatically descends to be store in the lower housing.

12 Claims, 15 Drawing Sheets

U.S. PATENT DOCUMENTS

2006/0003708 A1 * 1/2006 Jantti et al. ................ 455/90.3

FOREIGN PATENT DOCUMENTS

| EP | 1 075 125 | A2 | 2/2001 |
| EP | 1 150 476 | A2 | 10/2001 |
| EP | 1 220 517 | A1 | 7/2002 |
| EP | 1 422 911 | A2 | 5/2004 |
| EP | 1 548 776 | A1 | 6/2005 |
| FR | 2 858 102 | A1 | 1/2005 |
| JP | 11-112627 | | 4/1999 |
| JP | 11-331332 | | 11/1999 |
| JP | 2003-058299 | * | 2/2003 |
| JP | 2005-210649 | | 8/2005 |
| JP | 2006-74444 | | 3/2006 |

OTHER PUBLICATIONS

U.S. Appl. No. 11/227,113, filed Sep. 16, 2005, Taki et al.
U.S. Appl. No. 11/365,520, filed Mar. 2, 2006, Amano et al.

* cited by examiner

MOBILE TERMINAL DEVICE INCLUDING AN ELEVATING KEYBOARD MECHANISM

CROSS REFERENCES TO RELATED APPLICATIONS

This present invention contains subject matter related to Japanese Patent Application No. 2004-270415 filed in the Japanese Patent Office on Sep. 16, 2004, the entire contents of which being incorporated herein by reference.

TECHNICAL FIELD

The present invention relates to mobile terminal devices suited for use for and/or with, for example, mobile phones, PHS phones (personal handyphone systems), PDA devices (personal digital assistants) electronic dictionary devices, and mobile navigator devices.

BACKGROUND OF THE INVENTION

Japanese Unexamined Patent Application Publication No. 11-11267 discloses a foldable mobile radio communication device. In communication devices of this type, unless otherwise a key operation section is projected from a surface of a lower housing of the device, operability of the key operation section is deficient. As such, the foldable mobile radio communication terminal device is provided with a mechanism that causes respective keys of the key operation section to project from the surface section of the lower housing when the communication device is operated to an open state, thereby to enhance the operability of the respective keys of the key operation section.

However, in the case of a foldable mobile phone (mobile terminal device), when the mobile phone is in a closed state, an upper housing and a lower housing closes in opposition to each other to a state where the entirety of the key operation section, which is provided on the lower housing side, is covered by the upper housing. There arises a problem in that wasteful operation is necessary to rotationally operate the upper housing or lower housing by about 180° about a hinge portion on the rotation axis so that the mobile terminal device is put into an open state thereby to cause the key operation section to be exposed.

SUMMARY OF THE INVENTION

In order to address the problems described above, one embodiment of the invention resides in a mobile terminal device that includes an upper housing; a lower housing; a slide mechanism that intercouples the upper housing and the lower housing to be slidable along an open direction and a close direction opposite the open direction; a slide force exertion mechanism that exerts forces through the slide mechanism onto the upper housing and the lower housing for sliding along the open direction; and a slide force control mechanism that controls the slide force exertion mechanism to exert the forces onto the upper housing and the lower housing for sliding along the open direction in an opening event.

According to the embodiment of the invention, in the opening event, the slide force control mechanism controls the slide force exertion mechanism to exert the forces onto the upper and lower housings for sliding along the open direction. Thereby, in the opening event, the upper and lower housings can be driven to automatically slide along the open direction.

Another embodiment of the invention to address the above-described problems resides in a mobile terminal device that includes an upper housing; a lower housing; a slide mechanism; a key operation section provided in the lower housing; a slide mechanism that interconnects the upper housing and the lower housing to be slidable along an open direction and a close direction, the open direction being a direction wherein the key operation section covered by the upper housing in a closing event is exposed, and the close direction being a direction wherein the key operation section exposed in an opening event is covered by the upper housing; and an elevation mechanism that operates in association with the sliding movement of the slide mechanism, that drives the key operation section stored in the lower housing to ascend from the inside of the lower housing in the opening event, and that stores the key operation section in an ascended state into the lower housing in the closing event.

According to this embodiment of the invention, the elevation mechanism drives the key operation section stored in the lower housing to ascend from the inside of the lower housing in the opening event, and drives key operation section in the ascended state to be stored into the lower housing in the closing event. Thereby, the key operation section can be driven to automatically ascend from the inside of the lower housing in the opening event, and the key operation section can be automatically stored into the lower housing in the closing event.

DETAILED DESCRIPTION OF THE INVENTION

The invention can be adapted to mobile phones of the schemes of, for example, the PDC (personal digital cellular, CDMA (code division multiple access), W-CDMA (wideband-code division multiple access), and GSM (global system for mobile communications).

FIRST EMBODIMENT

Figure 1A:
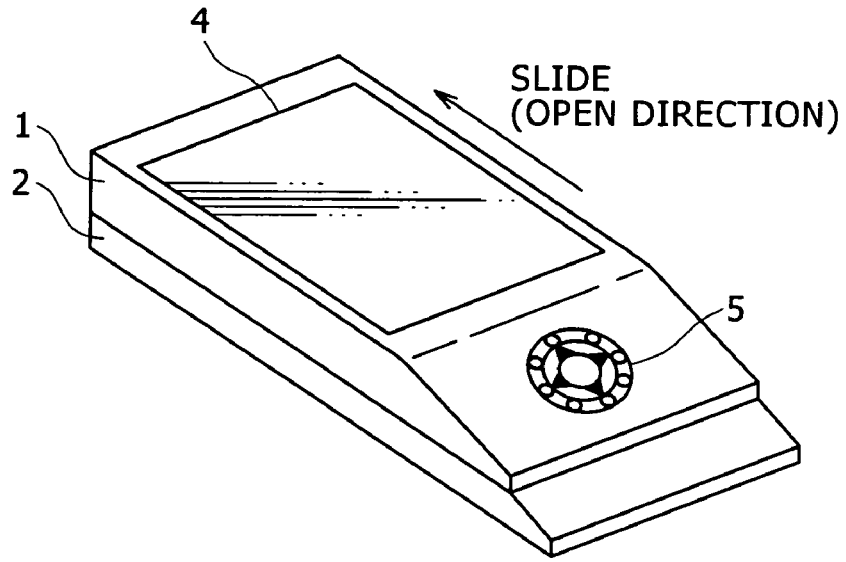
FIGS. 1A and 1B are perspective views showing exteriors of a mobile phone in closing and opening events according to a first embodiment employing the invention.
Figure 1B:
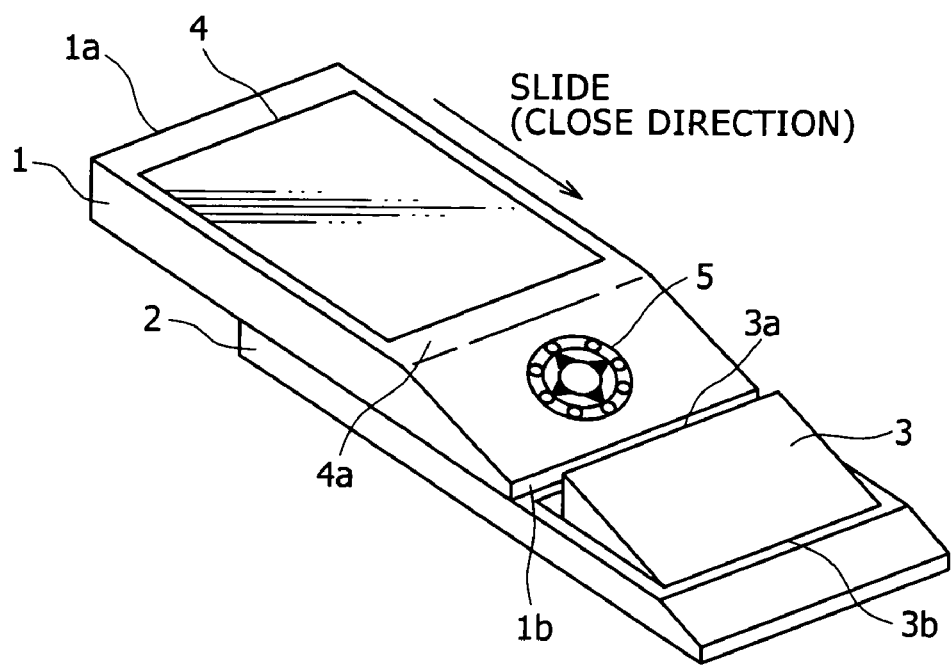

First, FIGS. 1A and 1B show exteriors of a mobile phone of a first embodiment according to the present invention. FIG. 1A shows the mobile phone in a closed state, and FIG. 1B shows the mobile phone in an open state. As shown in FIG. 1A, in the mobile phone in the opening event, an upper housing 1 is operated to slide to an opposite side of a key operation section 3 along the length direction of a lower housing 2, thereby to cause the key operation section 3 provided on the side of the lower housing 2 to expose. In the closing event, as shown in FIG. 1B, the upper housing 1 is operated to slide along the length direction of the lower housing 2 to the side of the key operation section 3, thereby to store the key operation section 3 provided on the side of the lower housing 2. Thus, the mobile phone is a slide-operation type.

More specifically, a below-described one-push open/close mechanism is provided in the mobile phone. In accordance with the one-push open/close mechanism, in the opening event where the upper housing 1 is operated to slide along the length direction of the lower housing 2 to the opposite side of a key operation section 3, exertion of a small force in the slide direction onto the upper housing 1, the mobile phone is automatically set to the open state. On the other hand, in the closing event where the upper housing 1 is operated to slide along the length direction of the lower housing 2 to the side of the key operation section 3, exertion of a small force in the slide direction onto the upper housing 1, the mobile phone is automatically set to the closed state.

In addition, in accordance with a below-described elevation mechanism, in the closing event, the key operation section 3 undergoes descending control to be stored into the lower housing 2. On the other hand, in the opening event, the key operation section 3 undergoes projection control to project from the inside of the lower housing 2 to a position not causing the forming a stepped portion between itself and the upper housing 1 (that is, to the substantially the same height as the upper housing 1).

In the key operation section 3, there are provided operation keys such as so-called ten-keys, an on-hook key, an off-hook key, a "#" key, and an "*" key. However, to prevent the drawing from being complicated, the keys are not shown in FIGS. 1A and 1B. In addition, in the mobile phone, there are provided a liquid crystal display section 4 (LCD section) and a rotational operation section 5 as a suboperation section on the side of the upper housing 1, which are disposed at all times, regardless of whether the mobile phone is in the opening or closing events.

(One-Push Open/Close Mechanism)

Figure 2:
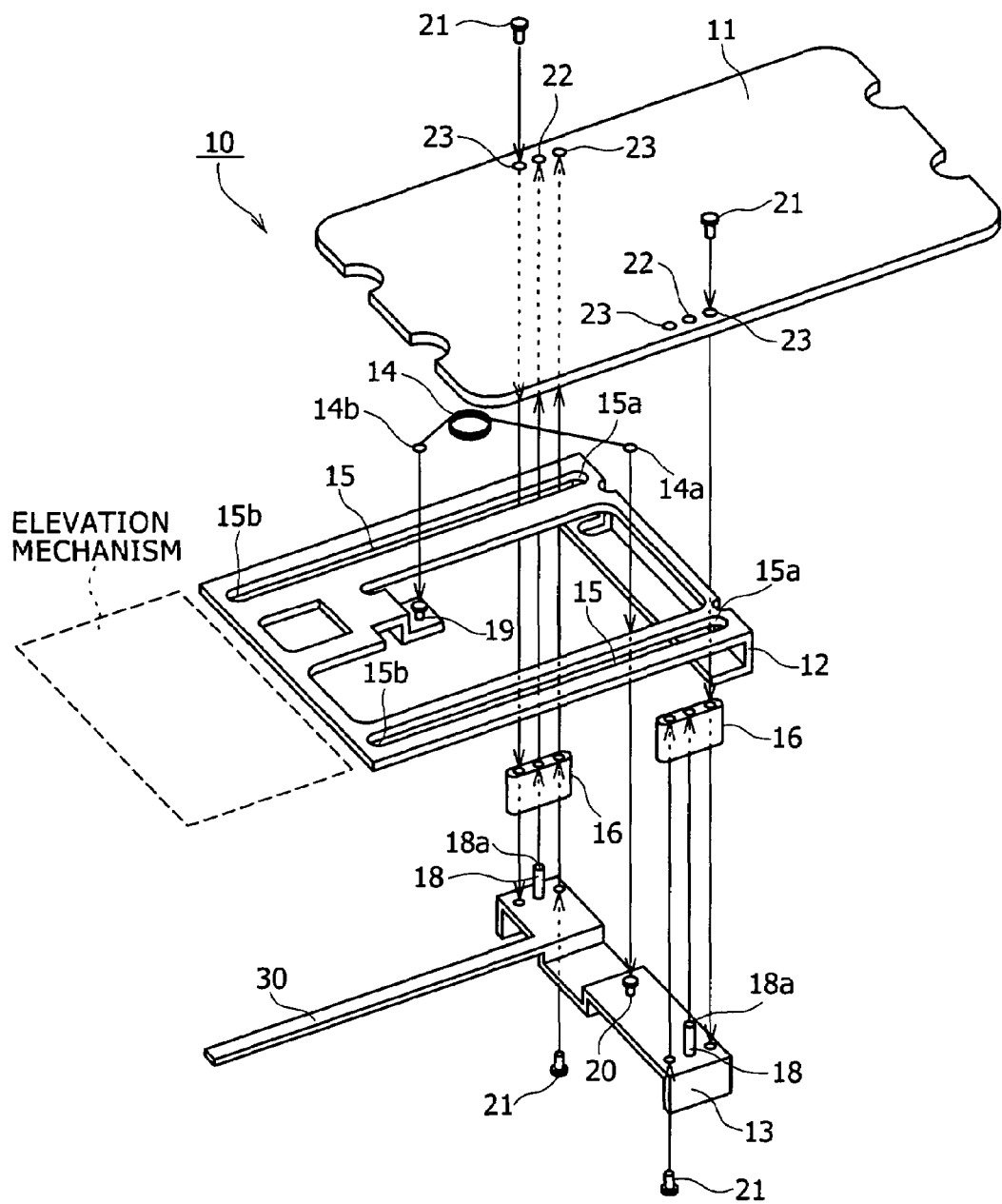
FIG. 2 is an exploded perspective view of a one-push open/close mechanism of the mobile phone according to the first embodiment.

FIG. 2 is an exploded perspective view of a one-push open/close mechanism 10 that enables the one-push opening/closing. The one-push open/close mechanism 10 is somewhat smaller than the upper housing 1, and as shown in FIG. 2, the mechanism 10 has an upper housing plate 11 secured and stored in the upper housing 1; and a rail mechanism 12 that is secured and stored in the lower housing 2 together with an elevation mechanism (shown by a dotted line) of the key operation section 3 which is shown by a dotted line along the length direction of the lower housing 2.

The one-push open/close mechanism 10 additionally has engagement members 16, a slide pin mechanism 13, and a spring member 14. The engagement members 16 are each secured and stored in the lower housing 2 and slidably engage rail grooves 15 of the rail mechanism 12. The slide pin mechanism 13 is screw-fastened to the upper housing plate 11 through the respective rail grooves 15 of the rail mechanism 12, thereby slidably intercouples the upper housing 1 and lower housing 2 along the length direction. The spring member 14 generates forces that, in the opening event, slidingly moves the upper housing 1 to the opposite side of a key operation section 3 with respect to the lower housing 2 and that, in the closing event, slidingly moves the upper housing 1 to the side of the key operation section 3 with respect to the rail mechanism 12.

Figure 3:
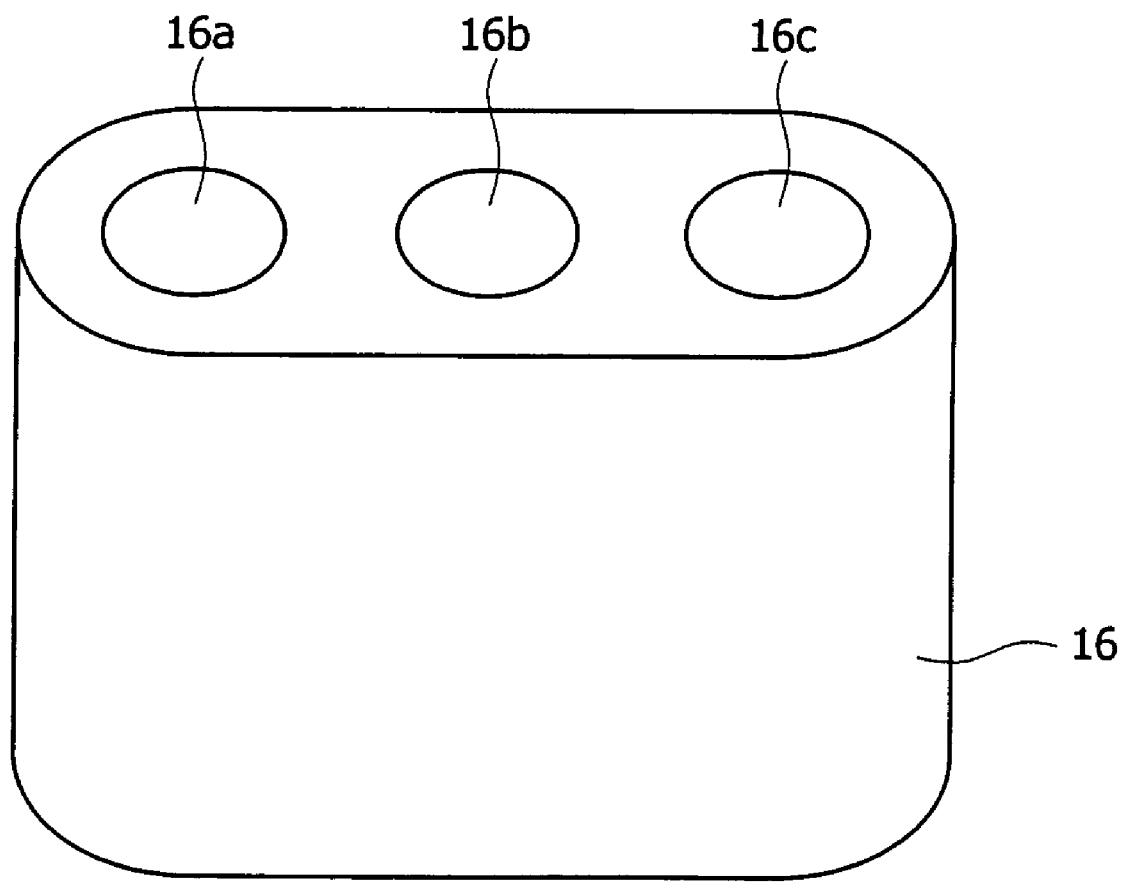
FIG. 3 is a perspective view showing engagement members provided in the one-push open/close mechanism of the mobile phone according to the first embodiment.

In assembly of the one-push open/close mechanism, to begin with, the engagement members 16 are fitted to respective slide pins 18 protruding from the slide pin mechanism 13. As shown in FIG. 3, the engagement member 16 has three hole portions 16a to 16c are juxtaposed, among which the respective hole portions 16a and 16c on two end sides are screwed through-holes, and the central hole portion 16c is a through-hole for the slide pin 18. As such, when fitting the engagement member 16 to the respective slide pins 18, the slide pin 18 is inserted into the central hole portion 16b of the engagement member 16.

Figure 4:
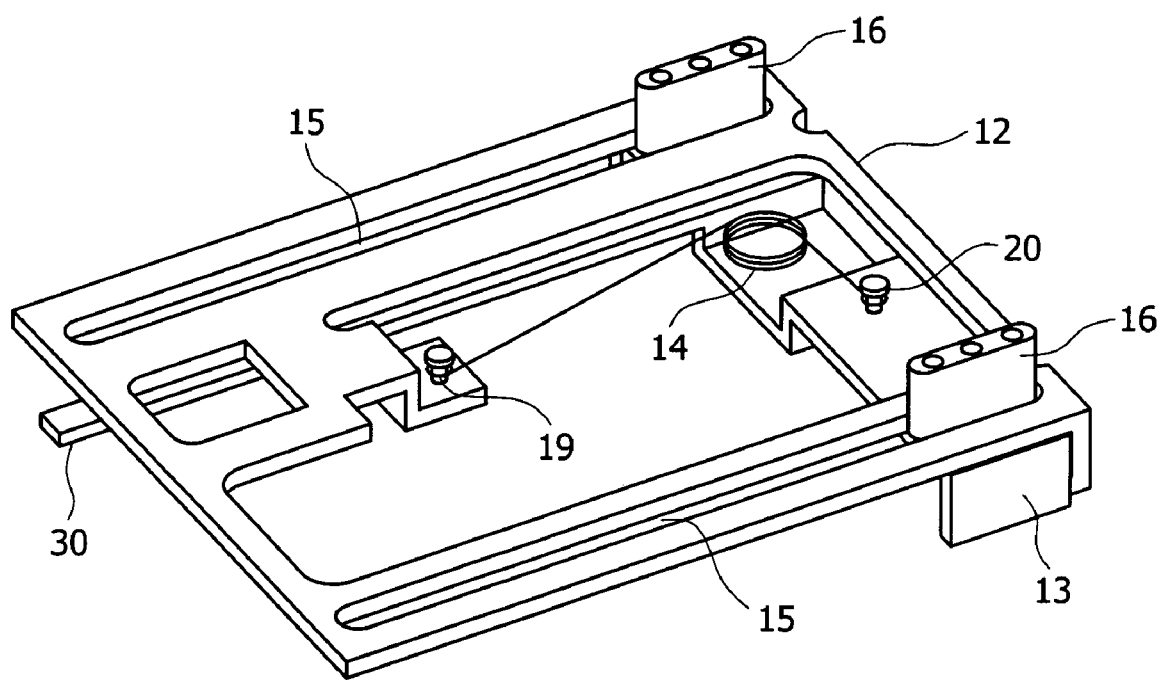
FIG. 4 is a perspective view showing essential portions of the one-push open/close mechanism of the mobile phone according to the first embodiment.

Then, the respective rail grooves 15 of the rail mechanism 12 are brought into engagement with the engagement member 16 into which the slide pin 18 is inserted. Then, in this state, one end portion 14a of the spring member 14 is anchored to an anchor pin 19 provided in the rail mechanism 12, and the other end portion, 14b, of the spring member 14 is anchored to an anchor pin 20 provided in the slide pin mechanism 13. Thereby, as shown in FIG. 4, the spring member 14 serving as a generating source of the forces in the open and close directions is provided to extend to the rail mechanism 12 and the slide pin mechanism 13.

Then, in the state where the spring member 14 is provided, the upper housing plate 11 stored in the upper housing 1 and the rail mechanism 12 and slide pin mechanism 13 stored in the lower housing 2 are fastened together with a screw 21.

More specifically, in the upper housing plate 11, insertion holes 22 into which vertex portions 18a of the slide pins 18 are inserted are individually provided in positions where the respective slide pins 18 of the slide pin mechanism 13 are in contact. In addition, in the upper housing plate 11, screwed holes 23 are individually provided at two sides of the insertion hole 22 in such a manner that the insertion hole 22 is positioned in the center.

As such, when screw-fastening the housing plate 11, the respective slide pins 18 of the slide pin mechanism 13 are inserted into the respective insertion holes 22 and, in this state, the upper housing plate 11 and the slide pin mechanism 13 screw-fastened with the screw 21 through the engagement member 16.

Although not shown in FIG. 2, the upper housing plate 11 is stored in the upper housing 1, as described above. In addition, the rail mechanism 12 and the slide pin mechanism 13 are stored in the lower housing 2. As such, when the upper housing 1 is operated to slide along the open or close direction, in conjunction with the movement of the upper housing 1, the slide pin mechanism 13 slidingly moves along the rail groove 15 of the rail mechanism 12.

In other terms, the upper housing 1 and the slide pin mechanism 13 slidingly move in synchronism. A range of the sliding moves (movable range) is from the position where the respective engagement member 16 contacts the one end portion 15a of the respective rail grooves 15 of the rail mechanism 12 to the position where the engagement member 16 contacts the other end portion 15b. As described in detail below, in the portion where the respective engagement member 16 contacts the one end portions 15a of the respective rail grooves 15 of the rail mechanism 12, the mobile phone is in the open state. On the other hand, in the position where the respective engagement member 16 contacts the other end portion 15b of the respective rail grooves 15 of the rail mechanism 12, the mobile phone is set to the closed state.

(One-Push Open/Close Operation)

Figure 5A:
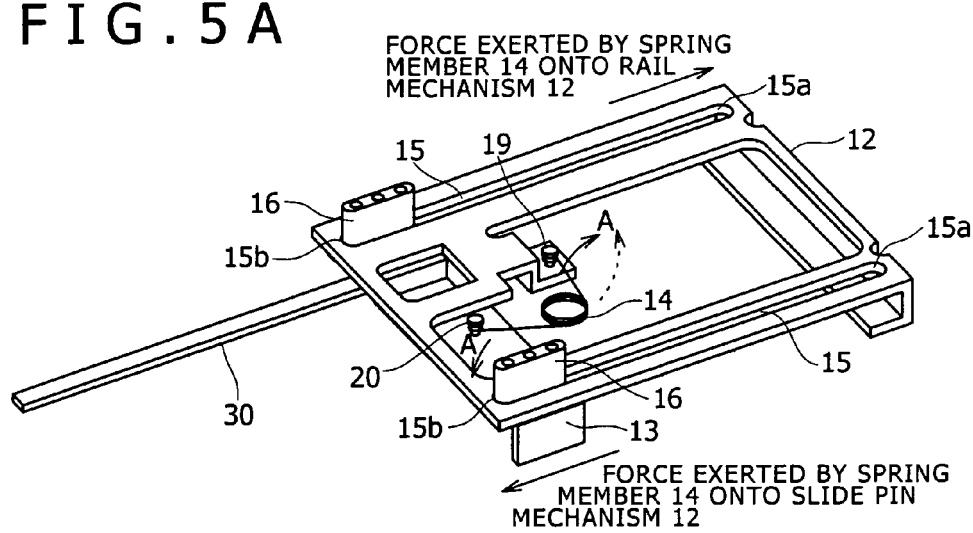
FIGS. 5A to 5C are perspective views descriptive of operation of essential portions of the one-push open/close mechanism of the mobile phone according to the first embodiment.
Figure 5B:
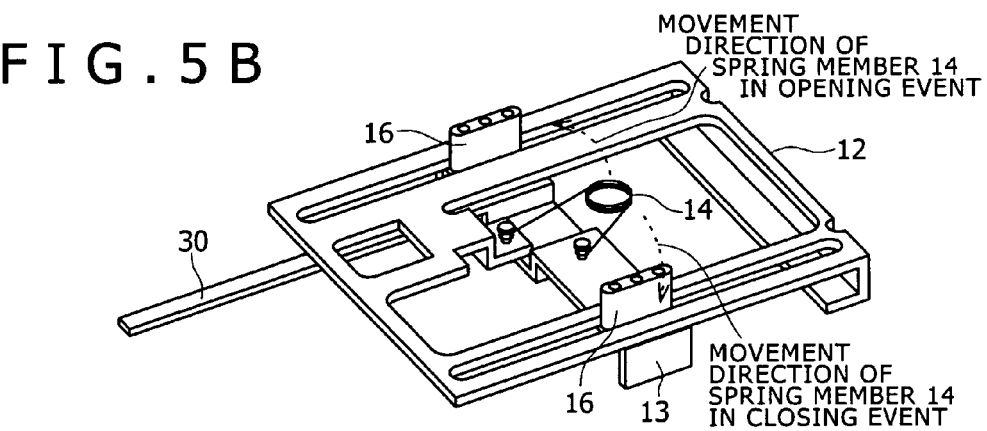
Figure 5C:
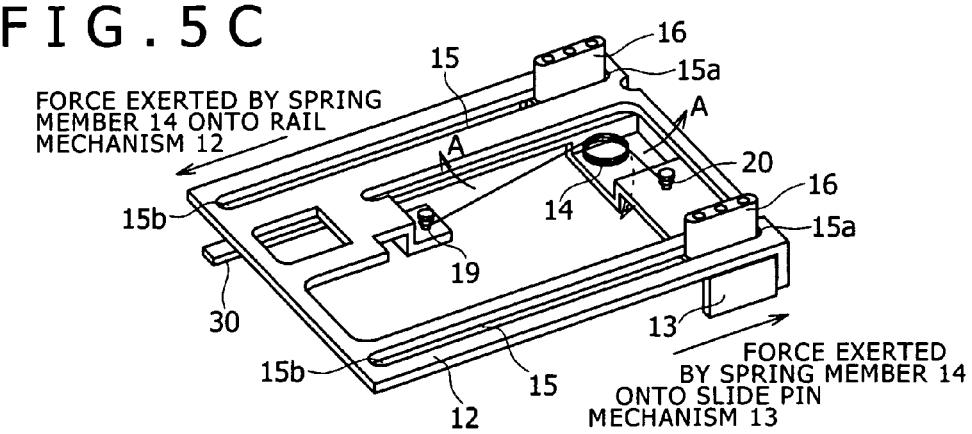

A one-push open/close operation to be performed with the one-push open/close mechanism will be described by reference to FIGS. 5A to 5C. FIG. 5A shows the positional relationship between the rail mechanism 12 and the slide pin mechanism 13 in the closed state of the mobile phone. FIG. 5B shows the positional relationship between the rail mechanism 12 and the slide pin mechanism 13 in a state intermediate between the closed state and the open state of the mobile phone. FIG. 5C shows the positional relationship between the rail mechanism 12 and the slide pin mechanism 13 in the open state of the mobile phone.

More specifically, when the mobile phone is shifted from the closed state to the open state, the positional relationship between the rail mechanism 12 and the slide pin mechanism 13 transitions in the order as: FIG. 5A to FIG. 5B and then to FIG. 5C. Conversely, when the mobile phone is shifted from the open state to the closed state, the positional relationship between the rail mechanism 12 and the slide pin mechanism 13 transitions in the order as: FIG. 5C to FIG. 5B and then to FIG. 5A.

(Operation in Opening Event)

First, in the closed state of the mobile phone, a force (shown by an arrow A in FIG. 5A) expanding outward of the spring member 14 acts to bring the respective engagement members 16, provided in the slide pin mechanism 13, into contact with the sides of the other end portion 15b of the respective rail grooves 15 of the rail mechanism 12. With the force of the spring member 14, the mobile phone is maintained in the state that upper housing 1 and the lower housing 2 substantially overlapped, as shown in FIG. 1A.

In the closed state, when shifting the mobile phone to the open state, a user holds the mobile phone by placing the lower housing 2 of the mobile phone on a palm of the user. Thereby, according to the structure of the human hand, a thumb of the hand holding the mobile phone is naturally induced to be positioned on the side of an upper face portion section of the upper housing 1. The user touches the upper face portion of the upper housing 1 by using the thumb; and while thus touching the upper face portion of the upper housing 1, the user moves the thumb along the opposite direction of the key operation section 3.

The force in the opposite direction of the key operation section 3, which is thus exerted by the user, is transferred to the upper housing plate 11, which is fixedly provided in the upper housing 1. The force is concurrently transferred to the slide pin mechanism 13 screw-fastened to the upper housing plate 11 through the respective engagement member 16. The force is then transferred through the slide pin mechanism 13 to the spring member 14 to act as a force that opposes the expansion force of the spring member 14 and that compresses the spring member 14.

When the user-exerted force in the opposite direction of the key operation section 3 increases in magnitude to be greater than the expansion force of the spring member 14, the spring member 14 is thereby compressed. Thereby, the slide pin mechanism 13 screw-fastened to the upper housing plate 11 through the respective engagement members 16 starts sliding movement along the respective rail grooves 15 of the rail mechanism 12.

Upon start of the sliding movement, as shown by a dotted-line arrow in FIG. 5A, the spring member 14 rotationally moves on axes or the anchor pins 19 and 20 to which, respectively, the one and other end portions 14a and 14b of the spring member 14 are anchored, thereby to cause the spring member 14 to transition in the position (=positional transition the spring member 14). FIG. 5B shows a state where the slide pin mechanism 13 is slidingly moved to substantially middle positions of the rail grooves 15 of the rail mechanism 12. The spring member 14 slowly moves in conjunction with the sliding movement of the slide pin mechanism 13. These states are shown in FIGS. 5B and 5A to enable comparison for the movement.

Then, the state transitions such that in the state shown in FIG. 5B, wherein the slide pin mechanism 13 has been slidingly moved to the substantially middle positions of the respective rail grooves 15 of the rail mechanism 12, because of the positional transition of the spring member 14, the expansion force of the spring member 14 is not transferred to the rail mechanism 12 and the slide pin mechanism 13. In other words, in the state, balancing is taking place between the expansion force of the spring member 14 and forces such as friction forces of the rail mechanism 12 and the slide pin mechanism 13. As such, in the state where slide pin mechanism 13 is slidingly moved to the substantially middle positions of the respective rail grooves 15 of the rail mechanism 12, even when the user stops exertion of the force by the thumb onto the upper face portion of the upper housing 1, the upper housing 1 remains in a static state thereof in the substantially middle positions.

Then, while touching the upper face portion of the upper housing 1, the user further moves his/her thumb along the opposite direction of the key operation section 3 from the state where the slide pin mechanism 13 is slidingly moved to the substantially middle positions of the respective rail grooves 15 of the rail mechanism 12. Thereby, the slide pin mechanism 13 is further slidingly moved to the sides of the other end portion 15b of the respective rail grooves 15 along the respective rail grooves 15 of the rail mechanism 12, and the spring member 14 is further positionally transitioned, as shown by the dotted-line arrow in FIG. 5B.

Upon positional transition of the spring member 14, the expansion force of the spring member 14 again acts on the rail mechanism 12 and the slide pin mechanism 13. However, the following is to be noted. In the closed state shown in FIG. 5A, the expansion force of the spring member 14 acts on the rail mechanism 12 and the slide pin mechanism 13 in the direction of bringing the engagement members 16 into contact with the sides of the other end portions 15b of the respective rail grooves 15. However, when the spring member 14 positionally moves past the substantially middle positions shown in FIG. 5B, the expansion force of the spring member 14 acts on the rail mechanism 12 and the slide pin mechanism 13 in the direction of bringing the engagement member 16 into contact with the sides of the one end portions 15a of the respective rail grooves 15.

Thereby, while touching the upper face portion of the upper housing 1, when the user further moves his/her thumb along the opposite direction of the key operation section 3 from the state where the slide pin mechanism 13 is slidingly moved to the substantially middle positions of the respective rail grooves 15 of the rail mechanism 12, the slide pin mechanism 13 is automatically slidingly moved to the sides of the one end portions 15a of the respective rail grooves 15 in accordance with the expansion force of the spring member 14 as shown by an arrow A in FIG. 5C.

More specifically, in the opening event, in the state where the upper face portion of the upper housing 1 in the closed state is touched by the thumb of the user, the force is exerted to move the upper housing 1 along the opposite direction of the key operation section 3. Thereby, the slide pin mechanism 13 is slidingly moved along the respective rail grooves 15 of the rail mechanism 12, and concurrently, the spring member 14 is positionally transitioned, as shown in FIGS. 5A and 5B.

Then, in the state where the spring member 14 is placed in the middle positions shown in FIG. 5B, a force is further exerted by the user to move the upper housing 1 along the opposite direction of the key operation section 3. Thereby, the expansion force of the spring member 14 acts on the rail mechanism 12 and the slide pin mechanism 13 in the direction of bringing the engagement member 16 into contact with the sides of the one end portions 15a of the respective rail grooves 15. Then, the force of the spring member 14 induces automatic sliding movement of the slide pin mechanism 13 along the rail mechanism 12, and the engagement members 16 contact the one end portions 15a of the respective rail grooves 15. Thereby, the sliding movement of the slide pin mechanism 13 is stopped, whereby the mobile phone is put into the open state.

Thereby, a so-called one-push open/close function can be implemented. That is, the function is implemented in the manner that while touching the upper face portion of the upper housing 1 in the closed state, the user exerts a force to induce only a slight movement of the upper housing 1 along the opposite direction of the key operation section 3. Thereafter, the upper housing 1 is caused to automatically slide along the opposite direction of the key operation section 3, thereby putting the mobile phone into the open state.

(Operation in Closing Event)

When shifting the mobile phone to the closed state, the user holds the mobile phone by placing the lower housing 2 of the mobile phone on a palm of the user. Thereby, according to the structure of the human hand, when a first finger of the hand holding the mobile phone is straightened, a tip portion of the first finger can be brought into contact with an end portion 1a on the opposite side of the key operation section 3 from a lower side of the upper housing 1. In this state, the user uses the first finger to operate the upper housing 1 to slide (sliding operation) to the side of the key operation section 3 shown in FIG. 1B.

The force in the direction of the key operation section 3, which is thus exerted by the user, is transferred to the upper housing plate 11, which is fixedly provided in the upper housing 1. The force is concurrently transferred to the slide pin mechanism 13 screw-fastened to the upper housing plate 11 through the respective engagement member 16. The force is then transferred through the slide pin mechanism 13 to the spring member 14 to act as a force that opposes the expansion force of the spring member 14 and that compresses the spring member 14.

When the user-exerted force in the direction of the key operation section 3 increases in magnitude to be greater than the expansion force of the spring member 14, the spring member 14 is thereby compressed. Thereby, the slide pin mechanism 13 screw-fastened to the upper housing plate 11 through the respective engagement members 16 starts sliding movement along the respective rail grooves 15 of the rail mechanism 12.

Upon start of the sliding movement, as shown by a dotted-line arrow in FIG. 5C, the spring member 14 rotationally moves on axes or the anchor pins 19 and 20 to which, respectively, the one and other end portions 14a and 14b of the spring member 14 are anchored, thereby to cause the spring member 14 to transition in the position (=positional transition the spring member 14). FIG. 5B shows the state where the slide pin mechanism 13 is slidingly moved to the substantially middle positions of the rail grooves 15 of the rail mechanism 12. The spring member 14 slowly moves in conjunction with the sliding movement of the slide pin mechanism 13. These states are shown in FIGS. 5C and 5B to enable comparison for the movement.

Then, the state transitions such that in the state shown in FIG. 5B, wherein the slide pin mechanism 13 has been slidingly moved to the substantially middle positions of the respective rail grooves 15 of the rail mechanism 12, because of the positional transition of the spring member 14, the expansion force of the spring member 14 is not transferred to the rail mechanism 12 and the slide pin mechanism 13. In other words, in the state, balancing is taking place between the expansion force of the spring member 14 and forces such as friction forces of the rail mechanism 12 and the slide pin mechanism 13. As such, in the state where slide pin mechanism 13 is slidingly moved to the substantially middle positions of the respective rail grooves 15 of the rail mechanism 12, even when the user stops the exertion of the force by the thumb onto the upper face portion of the upper housing 1, the upper housing 1 remains in a static state thereof in the substantially middle positions.

Then, while touching the upper face portion of the upper housing 1, the user further moves his/her thumb along the direction of the key operation section 3 from the state where the slide pin mechanism 13 is slidingly moved to the substantially middle positions of the respective rail grooves 15 of the rail mechanism 12. Thereby, the slide pin mechanism 13 is further slidingly moved to the sides of the other end portion 15b of the respective rail grooves 15 along the respective rail grooves 15 of the rail mechanism 12, and the spring member 14 is further positionally transitioned, as shown by the dotted-line arrow in FIG. 5B.

Upon positional transition of the spring member 14, the expansion force of the spring member 14 again acts on the rail mechanism 12 and the slide pin mechanism 13. However, the following is to be noted. In the closed state shown in FIG. 5C, the expansion force of the spring member 14 acts on the rail mechanism 12 and the slide pin mechanism 13 in the direction of bringing the engagement members 16 into contact with the sides of the one end portions 15a of the respective rail grooves 15. However, when the spring member 14 positionally moves past the substantially middle positions shown in FIG. 5B, the expansion force of the spring member 14 acts on the rail mechanism 12 and the slide pin mechanism 13 in the direction of bringing the engagement member 16 into contact with the sides of the other end portions 15b of the respective rail grooves 15.

Thereby, when the user further exerts a force in the direction of the key operation section 3 onto the end portion 1a of the upper housing 1 from the state where the slide pin mechanism 13 is slidingly moved to the substantially middle positions of the respective rail grooves 15 of the rail mechanism 12, the slide pin mechanism 13 is automatically slidingly moved to the sides of the other end portion 15b of the respective rail grooves 15 in accordance with the expansion force of the spring member 14 as shown by the arrow A in FIG. 5A.

More specifically, in the closing event, the force is exerted by the user onto the end portion 1a of the upper housing 1 in the open state, the slide pin mechanism 13 is slidingly moved along the respective rail grooves 15 of the rail mechanism 12, and concurrently, the spring member 14 is positionally transitioned, as shown in FIGS. 5C and 5B.

Then, in the state where the spring member 14 is placed in the middle positions shown in FIG. 5B, a force is further exerted by the user to move the upper housing 1 along the direction of the key operation section 3. Thereby, the expansion force of the spring member 14 acts on the rail mechanism 12 and the slide pin mechanism 13 in the direction of bringing the engagement member 16 into contact with the sides of the other end portions 15b of the respective rail grooves 15. Then, the force of the spring member 14 induces automatic sliding movement of the slide pin mechanism 13 along the rail mechanism 12, and the engagement members 16 contact the other end portions 15b of the respective rail grooves 15. Thereby, the sliding movement of the slide pin mechanism 13 is stopped, whereby the mobile phone is put into the closed state.

Thereby, a so-called one-push open/close function can be implemented in such a simple manner that when the user exerts a force to induce only slight movement of the upper housing 1 along the direction of the key operation section 3, then the upper housing 1 is driven to automatically slide along the direction of the key operation section 3, thereby putting the mobile phone into the closed state. This makes it possible to realize so-called one-push open/close mechanism.

(Elevation Mechanism)

(Configuration of Elevation Mechanism)

The elevation mechanism is operated in association with the one-push open/close mechanism, whereby in the closing event, the key operation section 3 undergoes descending control to be stored into the lower housing 2, and in the opening event, the key operation section 3 undergoes projection control to project from the inside of the lower housing 2 to a position not causing forming of a stepped portion (uneven height portion) between itself and the upper housing 1 (that is, to a position at substantially the same height as the upper housing 1).

Figure 6:
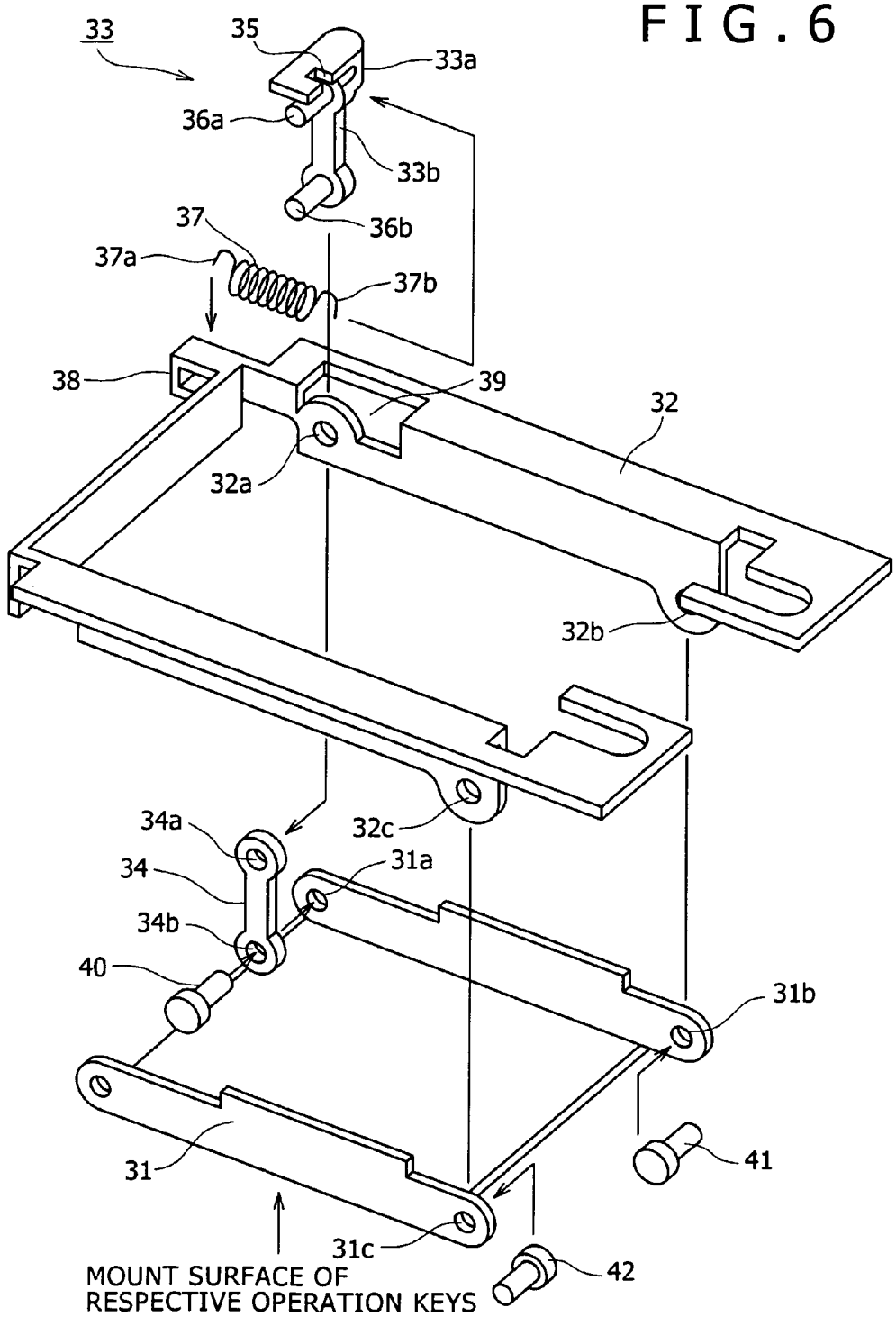
FIG. 6 is an exploded perspective view showing an elevation mechanism provided in the mobile phone according to the first embodiment.

FIG. 6 shows an exploded perspective view of the elevation mechanism. To facilitate a better understanding of the configuration of the elevation mechanism, FIG. 6 shows the view wherein a mount surface of respective operation keys is shown on a lower side. As can be seen from FIG. 6, the elevation mechanism has a key mount plate 31 on which the respective operation keys are mounted placed, and a support frame 32 for the key mount plate 31.

The elevation mechanism further has a first rotational connector 33, a second rotational connector 34 rotatably connected to the first rotational connector 33, and a coil spring 37.

The first rotational connector 33 is formed such that one rectangular planar member is bent to a substantially U shape, and a lower section 33b is bent in such a manner as to form the entirety of the first rotational connector 33 into a substantially T shape. A cutout portion 35 for connecting the coil spring 37 is provided in the upper section 33a. Connection pins 36a and 36b protruding in a direction perpendicular to the length direction are provided near both-end portions of one surface portion of the lower section 33b.

The second rotational connector 34 has pin holes 34a and 34b, individually formed along the direction perpendicular to the length direction, near the both end portions of the one surface portion of the rectangular planar member. As described in more detail below, of the respective pin holes 34a and 34b, the pin hole 34a is rotatably connected to the connection pin 36b provided in the lower section 33b of the first rotational connector 33.

The coil spring 37 has one end portion 37a and an other end portion 37b which are shaped as a hook. The one end portion 37a is provided to be hooked to a spring stopper portion 38 provided to the support frame 32. The other end portion 37b is provided to be hooked to the cutout portion 35 of the first rotational connector 33.

In assembly of the elevation mechanism described above, first, first rotational connector 33 is inserted into an insertion opening 39 provided in the support frame 32. Then, the connection pin 36a provided in the lower section 33b of the first rotational connector 33 is inserted into the pin hole 32a provided to the support frame 32, and the connection pin 36a is caulked. Thereby, the first rotational connector 33 is rotatably provided to the support frame 32.

The connection pin 36b of the lower section 33b provided to the support frame 32 is inserted into the pin hole 34a of the second rotational connector 34, and the pin hole 34a is caulked. Thereby, the second rotational connector 34 is rotatably connected with respect to the first rotational connector 33.

Then, a pin 40 is passed through the pin hole 34b of the second rotational connector 34 and a pin hole 31a of the key mount plate 31, and the pin 40 is caulked. Thereby, the first and second rotational connectors 33 and 34 are rotatably connected to the key mount plate 31.

Then, a pin 41 is passed through a pin hole 32b of the support frame 32 and a pin hole 31b of the key mount plate 31. In addition, a pin 42 is passed through a pin hole 32c of the support frame 32 and a pin hole 31c of the key mount plate 31, and the respective pins 41 and 42 are caulked. Thereby, the key mount plate 31 is vertically movably connected with respect to the support frame 32.

Figure 7A:
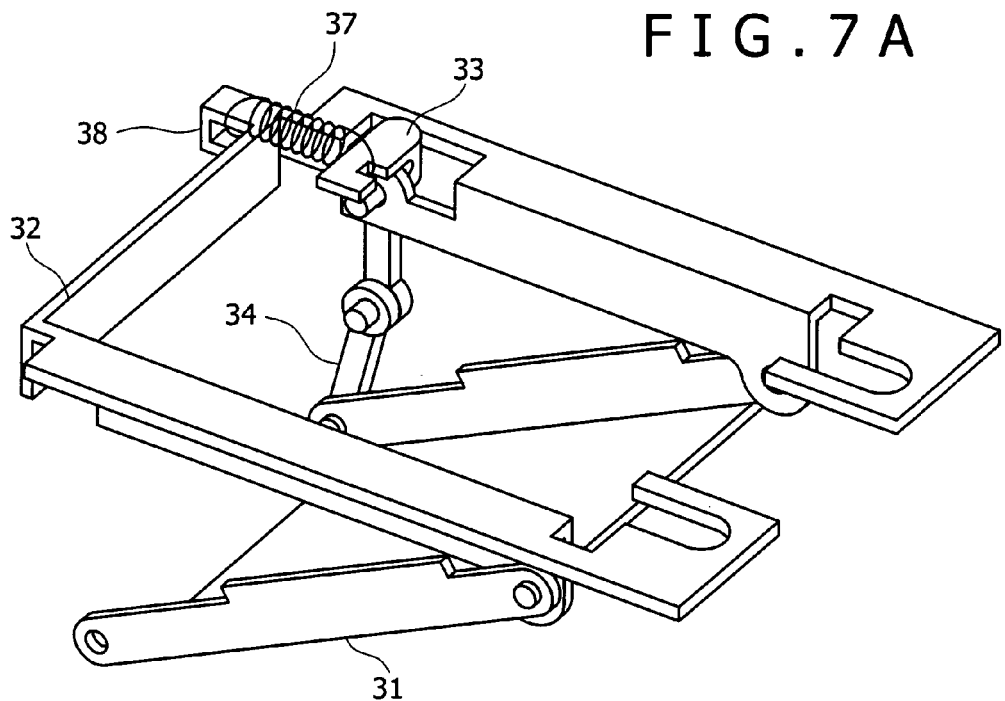
FIGS. 7A and 7B are perspective views showing an elevation mechanism provided in the mobile phone according to the first embodiment.
Figure 7B:
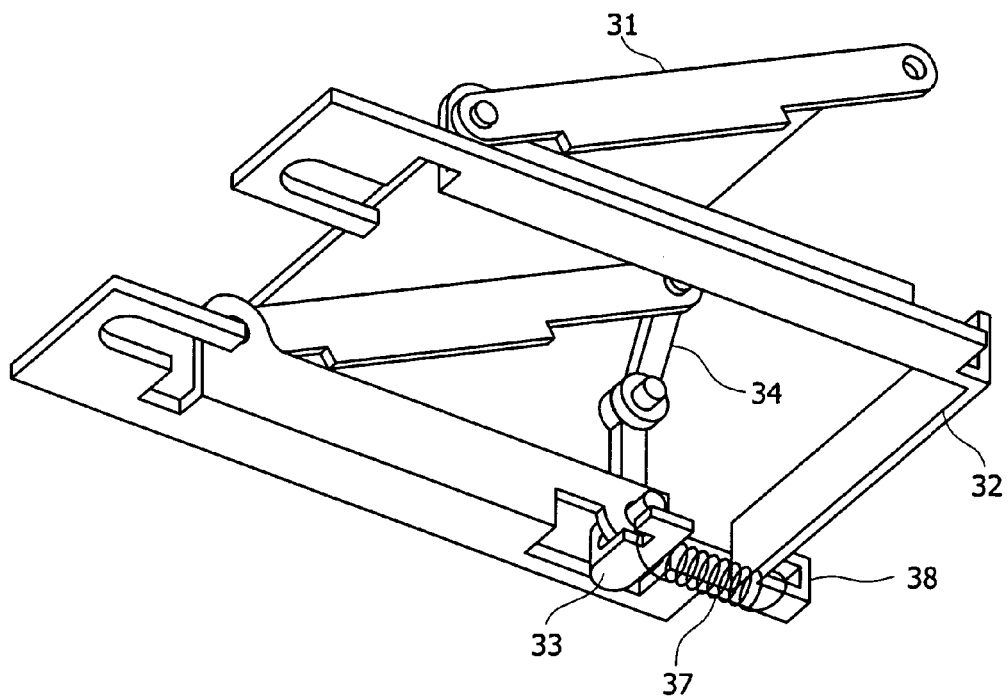

The one end portion 37a of the coil spring 37 is hooked and connected to the spring stopper portion 38 provided to the support frame 32. The other end portion 37b of the coil spring 37 is hooked and connected to the cutout portion 35 of the first rotational connector 33. In this manner, an elevation mechanism, as shown in FIGS. 7A and 7B, is assembled. FIG. 7A is a perspective view of the elevation mechanism viewed by positioning the key mount plate 31 in the lower side. FIG. 7B is a perspective view of the elevation mechanism viewed by positioning the key mount plate 31 is positioned in the upper side.

(Operation of Elevation Mechanism)

The elevation mechanism is mechanically controlled for the vertical (elevational) operation by a rotational operation rod 30 provided integrally with the slide pin mechanism 13 shown in FIGS. 2 to 5A and 5C. More specifically, as shown in FIGS. 5A to 5C, the rotational operation rod 30 performs a sliding movement along the length direction of the mobile phone in synchronism with the sliding movement the slide pin mechanism 13. With the sliding movement, the first rotational connector 33 of the elevation mechanism is rotationally operated, thereby to vertically move the key mount plate 31.

Figure 8A:
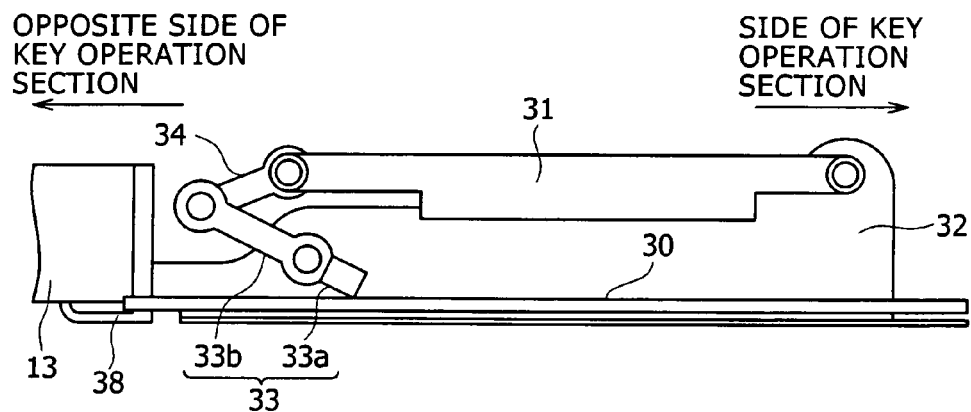
FIGS. 8A and 8B are views descriptive of operation in closing and opening events of the elevation mechanism provided in the mobile phone according to the first embodiment.
Figure 8B:
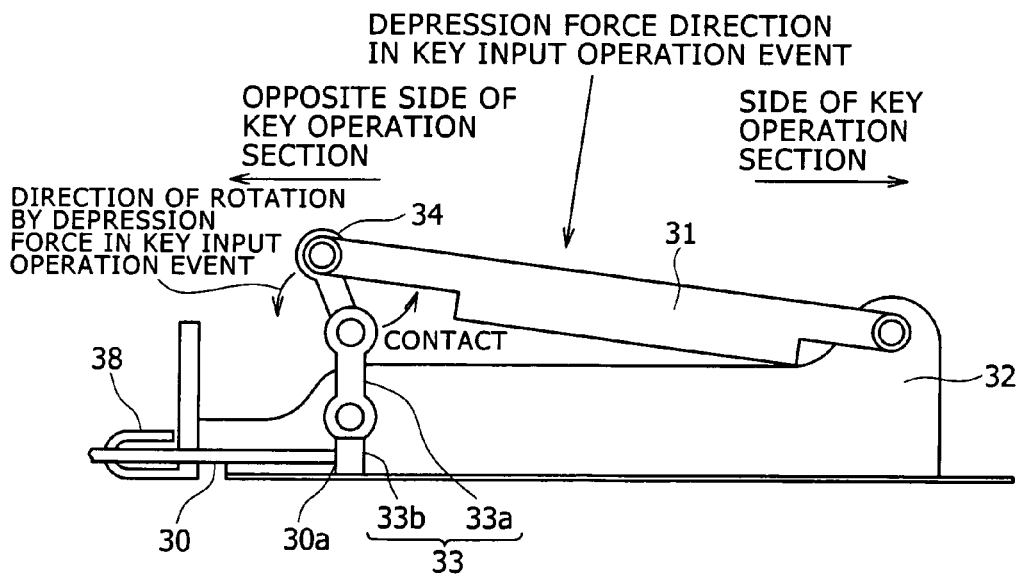

FIG. 8A shows the positional relationship in the closing event between rotational operation rod 30 and the first rotational connector 33. FIG. 8B shows the positional relationship in the opening event between rotational operation rod 30 and the first rotational connector 33. FIGS. 9A to 9E show the positional relationship between the rotational operation rod 30 and the first rotational connector 33 when the state has been shifted from the open state to the closed state.

(Operation in Opening Event)

Figure 9A:
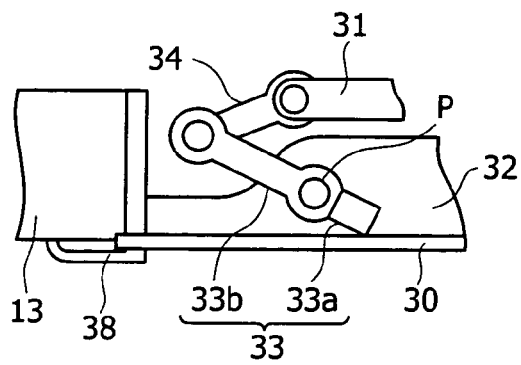
FIGS. 9A to 9E are views descriptive of operation in the closing and opening events of the elevation mechanism provided in the mobile phone according to the first embodiment.

First, as described by reference to FIG. 5A, in the closed state of the elevation mechanism, the engagement member 16 provided in the slide pin mechanism 13 is in the state of contact with the other end portions 15b of the respective rail grooves 15 of the rail mechanism 12, and the rotational operation rod 30 becomes a maximally protruded state. As shown in FIGS. 8A and 9A, in the maximally protruded state of the rotational operation rod 30, the upper section 33a of the first rotational connector 33 moves over the upper section 33a, and first rotational connector 33 is inclined toward the opposite side of the key operation section 3, wherein the first rotational connector 33 pulls the key mount plate 31 through the second rotational connector 34 to the opposite side of the key operation section 3, whereby the mount plate 31 undergoes descending control. Thereby, as shown in FIG. 1A, the state changes to a state where the key mount plate 31 is stored in the lower housing 2.

Then, upon exertion of the above-described force in the open direction (alternatively referred to as "open-direction force," hereafter) onto the upper housing 1, the slide pin mechanism 13 performs a sliding movement along the rail mechanism 12 to the one end portions 15a of the respective rail groove 15. With the sliding movement of the slide pin mechanism 13, the rotational operation rod 30 is moved such that, as shown in FIGS. 5B and 5C, the protrusion length is lowly reduced, and becomes shortest when the engagement members 16 contacts the one end portions 15a of the respective rail grooves 15 of the rail mechanism 12.

Figure 9B:
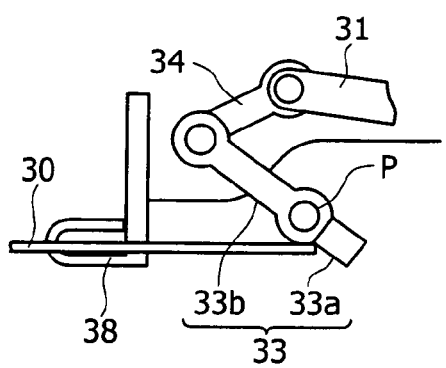
Figure 9C:
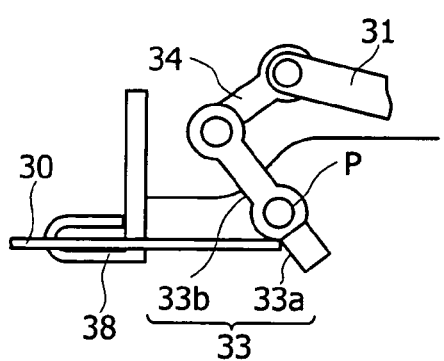
Figure 9D:
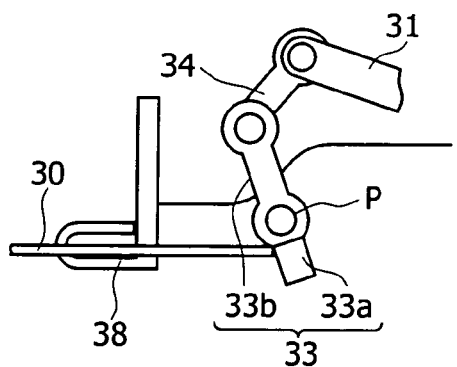

More specifically, with the open-direction force exerted onto the upper housing 1, when the slide pin mechanism 13 performs sliding movement, the rotational operation rod 30 is driven to perform sliding movement in association with the sliding movement of the slide pin mechanism 13, so that, as shown in FIG. 9A, the first rotational connector 33 positioned over the rotational operation rod 30 descends from the upper portion of the rotational operation rod 30, as shown in FIG. 9B.

The length of the rotational operation rod 30 is set to allow the first rotational connector 33 stayed over the rotational operation rod 30 to descend from the upper portion of the rotational operation rod 30 with a timing when the upper housing 1 slidingly moved to the open direction travels past an upper end portion 3a of the key operation section 3 (see FIG. 9B). As described in detail below, the ascending control of the key mount plate 31 is started from a timing when the first rotational connector 33 stayed over the upper portion of the rotational operation rod 30 has descended from the upper portion of the rotational operation rod 30. Accordingly, the key mount plate 31 slowly ascends with the timing when the upper housing 1 travels past the upper end portion 3a.

Then, upon further sliding movement of the rotational operation rod 30 along the slide direction, the upper section 33a of the first rotational connector 33 is pulled to the side of the key operation section 3 by the tension of the coil spring 37 provided between the first rotational connector 33 and the spring stopper portion 38 of the support frame 32. Then, as shown in FIGS. 9B to 9E, the first rotational connector 33 behaves such that the upper section 33a of the first rotational connector 33 rotates on a rotation axis coinciding with a connection point P of the connection with the support frame 32 in such a manner as to follow the rotational operation rod 30. With the rotation of the first rotational connector 33, the ascending control is performed in such a manner that the key mount plate 31 is slowly elevated through the first rotational connector 33 and the second rotational connector 34.

Figure 9E:
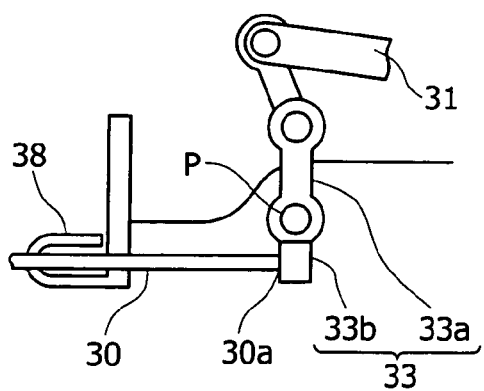

Then, as shown in FIG. 5C, upon contact of the engagement member 16 of the slide pin mechanism 13 with the respective rail grooves 15 of the one end portion 15a of the rail mechanism 12, the sliding movement of the rotational operation rod 30 also stops, wherein the protrusion length of the rotational operation rod 30 becomes shortest. When the protrusion length of the rotational operation rod 30 becomes shortest, as shown in FIG. 9E, the first rotational connector 33 is supported by the upper section 33a of the rotational operation rod 30, and the rotation of the first rotational connector 33 by the tension of the coil spring 37 is stopped. Thereby, as shown in FIG. 8B, key mount plate 31 is fixed with inclination descendent from the opposite side of the key operation section 3 to the side of the key operation section 3, whereby the mobile phone is set to the open state, as shown in FIG. 1B.

When the mobile phone is set to the open state, as described above, the key mount plate 31 is fixed with the inclination descendent from the opposite side of the key operation section 3 to the side of the key operation section 3. In addition, as shown in FIG. 1B, a portion from a substantial end portion 4a of LCD section 4 to an end portion 1b of upper housing 1 is formed to have the inclination of the same inclination angle as the key mount plate 31 that has been set to the open state. Then, in the open state of the mobile phone, the height position of the upper end portion 3a of the key operation section 3 is fixed at substantially the same height position of the end portion 1b of the upper housing 1.

Thereby, in the open state of the mobile phone, a descendent linear inclination is formed in the portion from the substantial end portion 4a of the LCD section 4 to the end portion 3b of the key operation section 3. In other words, the forming is performed so that no stepped portion occurs between the end portion 1b of the upper housing 1 and the upper end portion 3a of the key operation section 3.

In the mobile phone, the open state thereof is set as described above, wherein the key operation section 3 is exposed, and input operation is performed to input desired characters and the like by depression of respective keys provided on the key operation section 3. In this case, as described above, since a stepped portion can be prevented from occurring between the upper housing 1 and the upper end portion 3a of the key operation section 3, thereby to enable smooth input operation to be performed.

According to the configuration including the key mount plate 31 thus disposed with the inclination, in the opening event of the mobile phone, the depression force of the respective key in the event of key input operation is exerted in substantially the vertical direction with respect to the key mount plate 31, as shown in FIG. 8B. Thereby, the second rotational connector 34 is rotated toward the opposite side of the key operation section 3, causing a certain amount of depression of the key mount plate 31. However, because of the depression, the key mount plate 31 is brought into contact with the first rotational connector 34, thereby causing the first rotational connector 34 to support the key mount plate 31.

In the above, although the expression as "a certain amount of depression of the key mount plate 31 occurs" when the respective key is depressed, the amount of depression in practical operation is as small as, for example, 0.5 mm. As such, the key input operation can be performed without providing an uncomfortable feeling in input operation.

(Operation in Closing Event)

When shifting the mobile phone in the open state to the open state, the elevation mechanism is operated in the order as: FIG. 9E to FIG. 9D to FIG. 9C to FIG. 9B and then to FIG. 9A, whereby the key mount plate 31 is stored into the lower housing 2.

In specific, upon exertion of the open-direction force onto the upper housing 1, the slide pin mechanism 13 is driven to perform sliding movement along the rail mechanism 12 toward the other end portions 15b of the respective rail grooves 15. As shown in FIGS. 5C, 5B, and 5A, the protrusion length of the rotational operation rod 30 is increased by the sliding movement of the slide pin mechanism 13; and the protrusion length reaches the maximum length when the engagement members 16 contact the other end portions 15b of the respective rail grooves 15 of the rail mechanism 12.

More specifically, with the close direction force exerted onto the upper housing 1, when the slide pin mechanism 13 is driven to perform sliding movement, the rotational operation rod 30 is driven to perform sliding movement in association with the sliding movement of the slide pin mechanism 13. The upper section 33a of the first rotational connector 33 is pushed into the side of the key operation section 3 in opposition to the tension of the coil spring 37 provided between the first rotational connector 33 and the spring stopper portion 38 of the support frame 32. Thereby, as shown in FIG. 9E to FIG. 9B, the first rotational connector 33 behaves such that the upper section 33a of the first rotational connector 33 rotates on a rotation axis coinciding with a connection point P of the connection with the support frame 32 in correspondence with a pushed-in amount of the rotational operation rod 30, whereby as shown in FIG. 9A the first rotational connector 33 is positioned over the rotational operation rod 30. With the rotation of the first rotational connector 33, the first rotational connector 33 and the second rotational connector 34 are folded from respective connection points, whereby the key mount plate 31 undergoes descending control to slowly descend. Thereby, as shown in FIGS. 1A and 8A, the key operation section 3 is covered by the upper housing 1, wherein the key mount plate 31 is stored into the lower housing 2, and the mobile phone is put into the closed state.

The rotational operation rod 30 is all time in contact with the first rotational connector 33 in the opening and closing events. In the closing event, the first rotational connector 33 is quickly rotationally operated with the timing when the close direction force is exerted onto the upper housing 1. As such, synchronously with the exertion of the close direction force onto the upper housing 1, the descending control of the key mount plate 31 is started. Thereby, when the end portion 1b of the upper housing 1 reaches the position of the upper end portion 3a of the key operation section 3, the storing of the key mount plate 31 into the lower housing 2 can be substantially completed. Accordingly, in the closing operation event, it is makes it possible to prevent the inconvenience of causing the end portion 1b of the upper housing 1 to contact the upper end portion 3a of the key operation section 3 and to prevent the inconvenience of causing the mobile phone to be damaged by the contact.

EFFECTS/ADVANTAGES OF FIRST EMBODIMENT

As is clear from the above description, in the mobile phone of the first embodiment, as described by reference to FIGS. 5A to 5C, with use of the one-push open/close mechanism, the tension of the spring member 14 is used by being inversed in the opening and closing events. Thereby, in the opening event, the force causing slide along the opposite direction of the key operation section 3 is exerted onto the slide pin mechanism 13 to which the upper housing 1 is fixedly secured. On the other hand, in the force causing slide along the direction of the key operation section 3 is exerted onto the slide pin mechanism 13 to which the upper housing 1 is fixedly secured.

Accordingly, when the upper housing 1 is operated only to slightly slide along the open or close direction by using, for example, the thumb and first finger of the hand holding the mobile phone, the tension of the spring member 14 acts to enable the upper housing 1 to automatically slide along the open or close direction. Consequently, the mobile phone shiftable by the one-push operation to the open or close state can be provided.

In addition, as shown in FIGS. 5A to 5C, the rail mechanism 12, the slide pin mechanism 13, and the like are individually provided to be completely stored into the lower housing 2. As such, as shown in FIGS. 1A and 1B, the rail mechanism 12, the slide pin mechanism 13, and the like are not exposed to the outside of the lower housing 2. Consequently, the overall surface section of the upper housing 1 and lower housing 2 including sidewall portions of the lower housing 2 can be a design object, and the range of design probability can be widened.

Further, in the mobile phone of the first embodiment, the ascending/descending control of the elevation mechanism is performed by the rotational operation rod 30 provided in the slide pin mechanism 13, whereby the ascending/descending control of the key mount plate 31 can be performed in association with the sliding operation being performed in the opening and closing events.

As such, according to the first embodiment, the novel mobile phone can be provided wherein the upper housing 1 is operated only to slightly slide along the open or close direction, whereby in the opening event, the upper housing 1 automatically slides along the open direction, and the key operation section 3 automatically ascends from the lower housing 2; and in the closing event, the upper housing 1 automatically slides along the close direction, and the key operation section 3 automatically descends to be stored into the lower housing 2.

Further, according to the mobile phone of the first embodiment, a stepped portion does not occur between the end portion 1b of the upper housing 1 and the upper end portion 3a of the key operation section 3 (see FIG. 1B), smooth input operation can be performed.

SECOND EMBODIMENT

Figure 10A:
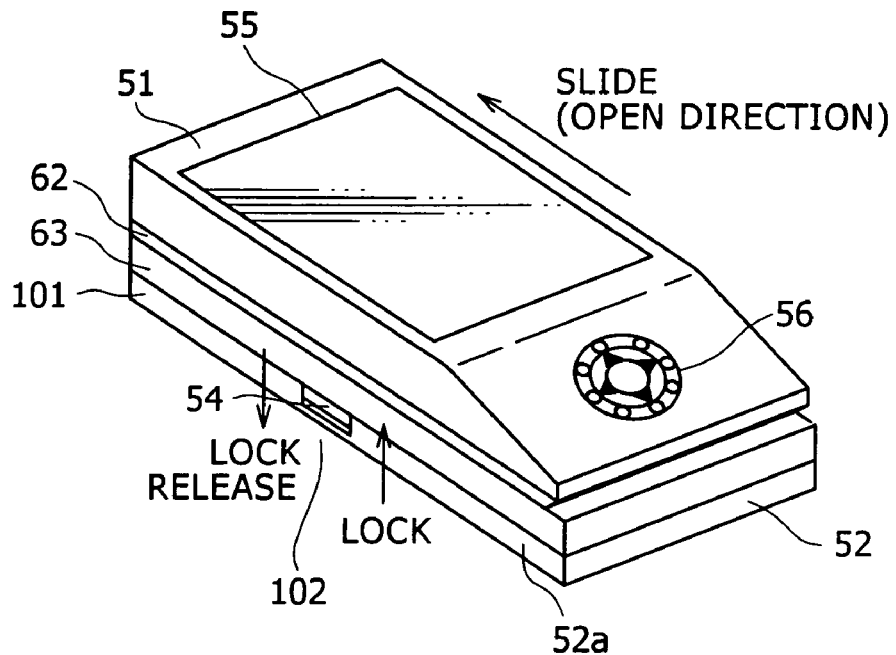
FIGS. 10A and 10B are perspective views showing exteriors in closing and opening events of a mobile phone according to a second embodiment adapting the invention.
Figure 10B:
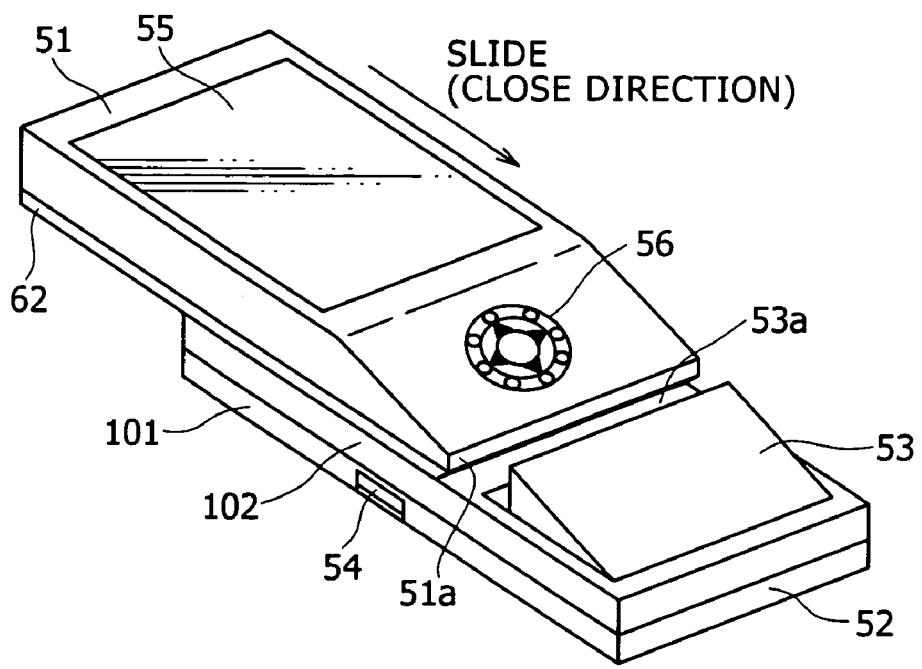

A mobile phone of a second embodiment will be described herebelow. FIG. 10A shows the mobile phone of the second embodiment in the closing event, and FIG. 10B shows the mobile phone in the opening event.

Similarly as the mobile phone of the first embodiment described above, in the case of the mobile phone of the second embodiment, as shown in FIG. 10A, in the opening event, an upper housing 51 is operated to slide to the opposite side of a key operation section 53 along the length direction of a lower housing 52, thereby to cause the key operation section 53 provided on the side of the lower housing 52 to expose. In the closing event, as shown in FIG. 10B, the upper housing 51 is operated to slide along the length direction of the lower housing 52 to the side of the key operation section 53, thereby to store the key operation section 53 provided on the side of the lower housing 52. Thus, the mobile phone is a slide-operation type.

In the case of the mobile phone of the second embodiment, however, a lock button 54 is provided in a sidewall portion 52 on one side of the sidewall portion 52. In the opening event, when the lock button 54 is operated along a lock release direction shown by an arrow in FIG. 10A, the lock/slide mechanism is released, and the mobile phone is automatically set to the open state. On the other hand, in the closing event, when the upper housing 51 is operated to slide along the length direction of the sidewall portion 52 to the side of the key operation section 53, the upper housing 51 is locked by the lock/slide mechanism to the sidewall portion 52, whereby the mobile phone is set to the closed state.

In addition, in accordance with the lock/slide mechanism, the ascending control and the descending control are performed in association with the sliding operation of the upper housing 51. In the closing event, the key operation section 53 undergoes the descending control to be stored into the lower housing 52. On the other hand, in the opening event, the key operation section 53 is undergoes the ascending control to project from the inside of the lower housing 52 to a position not forming a stepped portion between itself and the upper housing 51 (that is, to the substantially the same height as the upper housing 51).

In the key operation section 53, there are provided operation keys such as so-called ten-keys, an on-hook key, an off-hook key, a "#" key, and an "*" key. However, to prevent the drawing from being complicated, the keys are not shown in FIGS. 10A and 10B. In addition, in the mobile phone, there are provided a liquid crystal display section 4 (LCD section) and a rotational operation section 5 as a suboperation section on the side of the upper housing 51, which are disposed at all times, regardless of whether the mobile phone is in the opening or closing events.

(Lock/Slide Mechanism)

Figure 11:
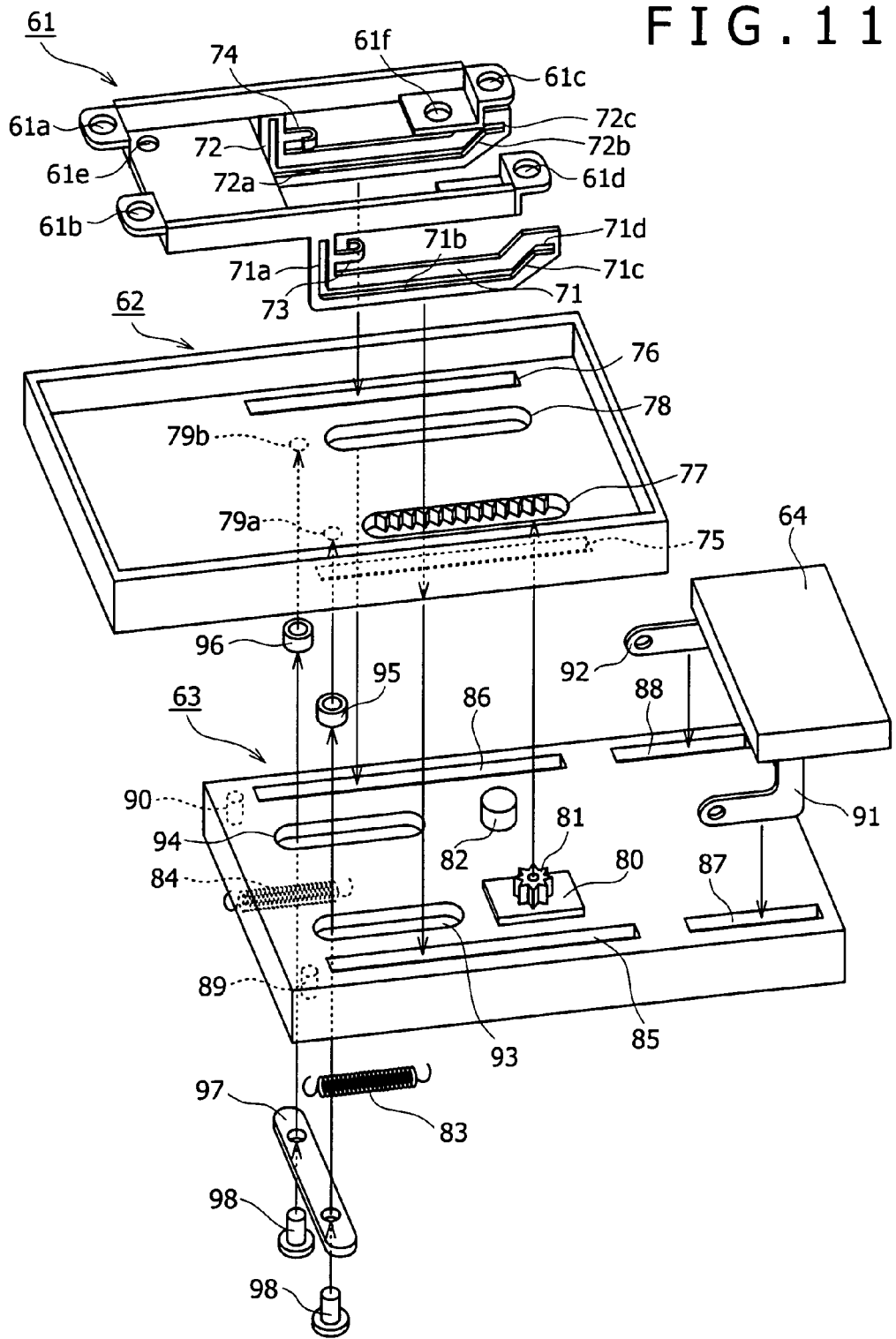
FIG. 11 is an exploded perspective view a lock/slide mechanism of the mobile phone according to the second embodiment.

FIG. 11 is an exploded perspective view of the lock/slide mechanism. FIG. 11, primarily, shows a frame mechanism 61, a lower-half housing 62 of the upper housing 51, an upper-half housing 63 of the lower housing 52, and a key mount plate 64 on which the key operation section 53 is placed. As such, it is desired to be understood that FIG. 11 does not show the upper-half housing of the upper housing 51 and the lower-half housing of the lower housing 52.

As shown in FIG. 11, the frame mechanism 61 has lock/slide rails 71 and 72 in a pair.

The one lock/slide rail 71 has a lock-button dedicated rail groove portion 71a for slidingly moving the lock button 54 along the lock or lock release directions shown in FIG. 10; a parallel rail groove portion 71b for slidingly moving the key mount plate 64 along the length direction of the lower housing 52; an inclined rail groove portion 71c for diagonally slidingly moving the mount plate 64 between a lower face portion and an upper face portion of the lower housing 52; and a position-fixing rail groove portion 71d provided parallel to the parallel rail groove portion 71b to fix the position of the key mount plate 64 in the ascending-controlled state. The respective rail groove portions 71a to 71d are provided in the form of a single continuous rail groove portion.

The one lock/slide rail 71 has a hook portion 73 connected to one end portion of a coil spring 83 that generates tension for slidingly moving the upper housing 51 when the lock button 54 undergoes release operation.

The other lock/slide rail 72 does not have a lock-button dedicated rail groove portion (as the portion 71a), but has a parallel rail groove portion 71a for slidingly moving the key mount plate 64 along the length direction of the lower housing 52; an inclined rail groove portion 72b for diagonally slidingly moving the mount plate 64 between a lower face portion and an upper face portion of the lower housing 52; and a position-fixing rail groove portion 72c provided parallel to the parallel rail groove portion 72b to fix the position of the key mount plate 64 in the ascending-controlled state. Similar to the case of the rail 71, respective rail groove portions 72a to 72c are provided in the form of a single continuous rail groove portion.

In addition, the other lock/slide rail 72 has a hook portion 74 connected to one end portion of a coil spring 84 that generates tension for slidingly moving the upper housing 51 when the lock button 54 undergoes release operation.

The lower-half housing 62 of the upper housing 51 has a capacity capable of storing the frame mechanism 61, and has through-holes 75 and 76 for passing through the respective lock/slide rails 71 and 72 in the pair. The housing 62 has a gear-dedicated rail groove portion 77 that engages a damper gear 81 of a damper 80 provided in the upper-half housing 63 of the lower housing 52; and rail groove portion 78 that engages an engagement member 82 provided in the upper-half housing 63 of the lower housing 52.

The upper-half housing 63 of the lower housing 52 has the damper 80 having the damper gear 81 that engages the gear-dedicated rail groove portion 77 of the housing 62; the engagement member 82 that engages the rail groove portion 78 of the housing 62; and through-holes 85 and 86 for passing through the lock/slide rails 71 and 72 passed through the through-holes 75 and 76 of the housing 62, respectively.

The housing 63 additionally has through-holes 87 and 88 for passing through respective leg portions 91 and 92 of the key mount plate 64; and anchor pins 89 and 90 for connecting the respective other end portions of the respective coil springs 83 and 84 connected to the hook portions 73 and 74 of the lock/slide rails 71 and 72 passed through the respective through-holes 85 and 86.

The housing 63 further has respective rail groove portions 93 and 94 that, in the case that the upper housing 51 and the sidewall portion 52 are connected together with a screw 98 through engagement members 95 and 96 and a connection plate 97, enable the sidewall portion 52 to slidingly move with respect to the upper housing 51 in engagement with the respective engagement members 95 and 96 in the open and close directions.

In the case of assembling the lock/slide mechanism, first, the respective lock/slide rails 71 and 72 of the frame mechanism 61 are passed through through-holes 75 and 76 of the lower-half housing 62 of the upper housing 51, and the frame mechanism 61 is stored into the housing 62. Then, through respective screw holes 61a to 61f provided in the frame mechanism 61 and the like, the frame mechanism 61 is screw-fastened to the housing 62.

Subsequently, the respective lock/slide rails 71 and 72 of the frame mechanism 61 screw-fastened to the lower-half housing 62 are passed through the respective through-holes 85 and 86 provided in the upper-half housing 63 of the lower housing 52. In addition, the damper gear 81 of the damper 80 of the housing 63 is engaged with the gear-dedicated rail groove portion 77 of the housing 62, and the engagement member 82 of the housing 63 is engaged with the rail groove portion 78 of the lower-half housing 62. Then, the engagement members 95 and 96 are inserted into the respective rail groove portions 93 and 94 of the upper-half housing 63, and the connection plate 97 is placed on the respective engagement members 95 and 96 from a lower side of the housing 63, the screw 98 is mated with the screw holes 79a and 79b, provided in the lower-half housing 62, through the connection plate 97 and the respective engagement members 95 and 96. Thereby, the upper housing 51 and the lower housing 52 are connected slidably along the open and close directions.

Then, in the state described above, the one end portion of the coil spring 83 is connected to the hook portion 73 provided to the lock/slide rail 71 extending to the lower side of the housing 63, and the other end portion of the coil spring 83 is connected to an anchor pin 89 provided in the lower housing 63. Likewise, the one end portion of the coil spring 84 is connected to the hook portion 74 provided to the lock/slide rail 72, and the other end portion of the coil spring 84 is connected to an anchor pin 90 provided in the lower housing 63. Thereby, with the respective coil springs 83 and 84, the tension for setting the mobile phone to the open state shown in FIG. 10B is exerted onto the upper housing 51 and the lower housing 52.

Figure 12:
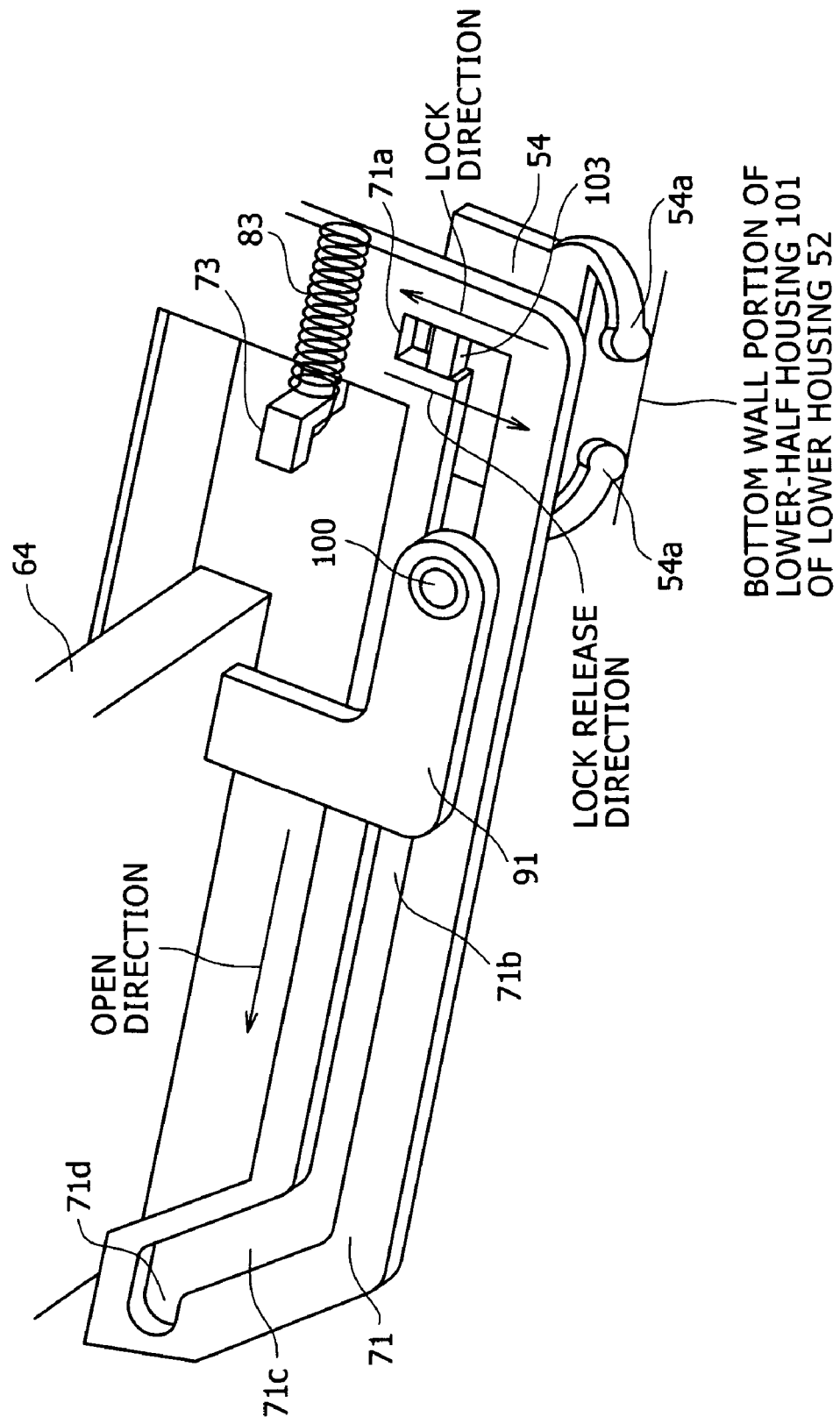
FIG. 12 is an enlarged view of essential portions of the lock/slide mechanism of the mobile phone in the closing event according to the second embodiment.

Subsequently, the leg portions 91 and 92 of the key mount plate 64 are passed through the through-holes 87 and 88 of the housing 63. In this state, the respective leg portions 91 and 92 of the key mount plate 64 and the respective lock/slide rails 71 and 72 are slidably connected to. FIG. 12 is an enlarged view of a connection portion between the leg portion 91 of the key mount plate 64 and the lock/slide rail 71.

As can be seen from FIG. 12, the leg portion 91 of the key mount plate 64 is connected by a connection pin 100 to the lock/slide rail 71 such that the key mount plate 64 is slidingly movable along the parallel rail groove portion 71b, inclined rail groove portion 71c, and the position-fixing rail groove portion 71d.

Although not shown, similarly as above, the leg portion 92 of the key mount plate 64 is connected by a connection pin to the other lock/slide rail 72 such that the key mount plate 64 is slidingly movable along the parallel rail groove portion 72a, inclined rail groove portion 72b, and position-fixing rail groove portion 72c.

Then, the lock button 54 is provided in a lower-half housing 101 shown in FIGS. 10A and 10B such that, as shown in FIG. 12, an anchor pin 103 of the lock button 54 is inserted into the lock-button dedicated rail groove portion 71a (or, the parallel rail groove portion 71b) of the lock/slide rail 71 through a button installation opening 102 provided in the housing 101. Thereby, the assembly of the lock/slide mechanism is completed.

(Operation of Lock/Slide Mechanism)

Operation of the lock/slide mechanism in the opening and closing events will be described herebelow.

(Operation in Opening Event)

At the outset, when the mobile phone of the second embodiment is in the closed state, the upper housing 51 and the lower housing 52 are in the state where they are overlapped in the up and down direction, as shown in FIG. 10A. In this case, the respective coil springs 83 and 84, which are provided to intercouple the upper-half housing 63 of the lower housing 52 and the respective lock/slide rails 71 and 72, are put into extended states. In addition, as shown in FIG. 12, the anchor pin 103 of the lock button 54 provided in the lower-half housing 101 of the lower housing 52 engages the lock-button dedicated rail groove portion 71a of the lock/slide rail 71, whereby the configuration becomes a state wherein the compression forces of the respective coil springs 83 and 84 are inhibited, and the frame mechanism 61 is stopped from sliding to the open direction.

More specifically, as shown in FIG. 12, the lock button 54 has a pair of extensible arms 54a arcuate in a direction perpendicular to the length direction of the lower housing 52. In the case that the extensible arms 54a are provided in the lower-half housing 101 of the lower housing 52, the lock button 54 is pushed up by forces of extention of the extensible arms 54a.

The lock-button dedicated rail groove portion 71a and parallel rail groove portion 71b of the lock/slide rail 71 slide along the anchor pin 103 of the lock button 54. When the mobile phone is set to the closed state, the lock-button dedicated rail groove portion 71a of the lock/slide rail 71 is driven to slide to the position of the anchor pin 103 of the lock button 54. Then, with forces of extention of the extensible arms 54a, the lock button 54 is pushed up, whereby the anchor pin 103 enters the lock-button dedicated rail groove portion 71a.

Thereby, as described above, the anchor pin 103 of the lock button 54 is engaged with the lock-button dedicated rail groove portion 71a, compression forces of the respective coil springs 83 and 84 are inhibited, thereby to prevent the frame mechanism 61 from sliding along the open direction.

Figure 13:
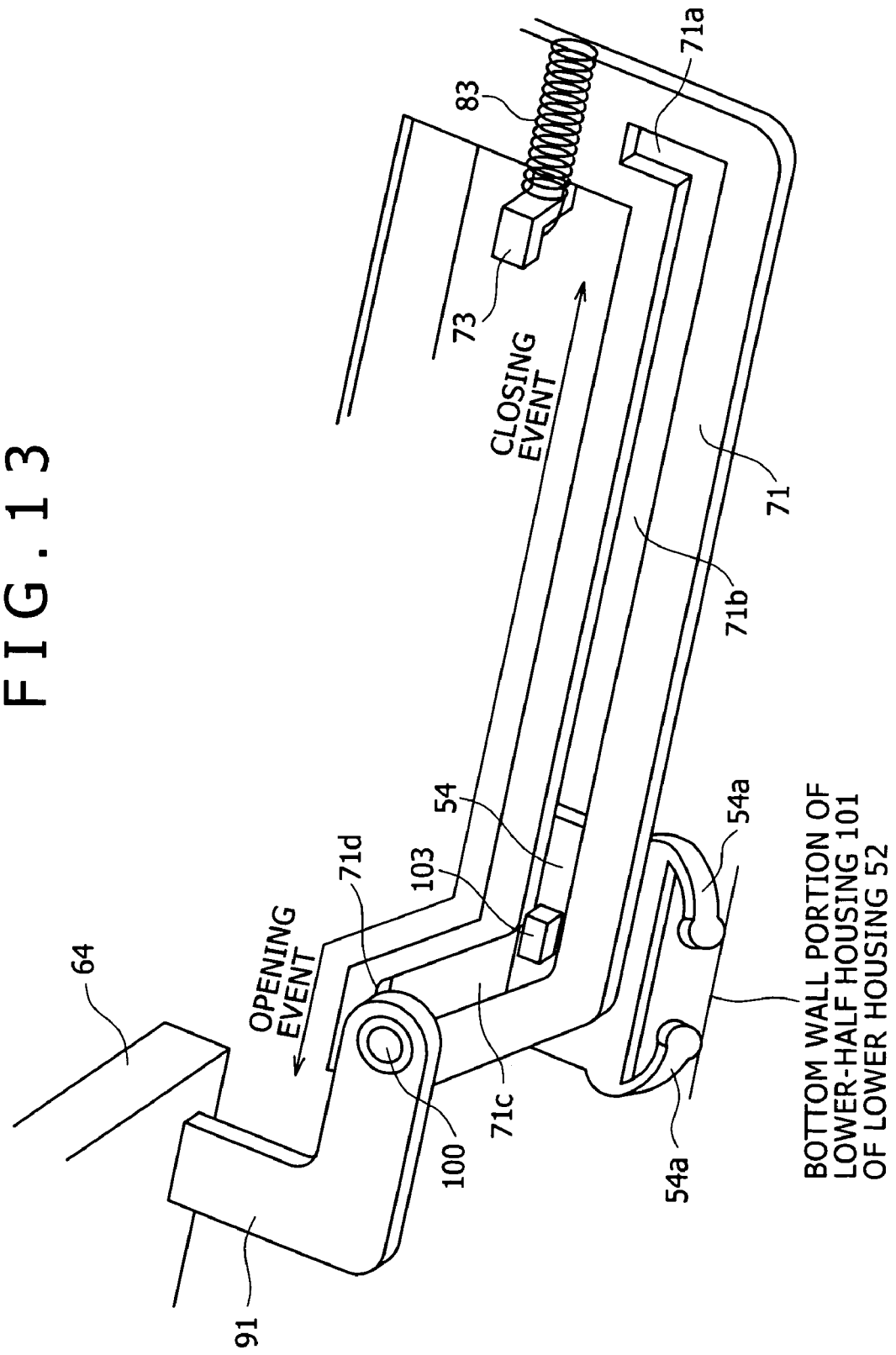
FIG. 13 is an enlarged view of predictions of the mobile phone according to the second embodiment.

Then, when the mobile phone is shifted from the above-described closed state to the open state, the user performs depression operation to depress the lock button 54 to a lock release direction, as shown in FIG. 12. Upon the depression operation, the respective extensible arms 54a of the lock button 54 are compressed between themselves and a bottom wall portion of the lower-half housing 101 of the lower housing 52, as shown in FIG. 13. Then, as a result of the compression of the respective extensible arms 54a of the lock button 54, the anchor pin 103 descends to the position of the parallel rail groove portion 71b of the lock/slide rail 71.

As described above, in the closing event, the anchor pin 103 of the lock button 54 is engaged with the lock-button dedicated rail groove portion 71a, whereby the compression forces of the respective coil springs 83 and 84 are inhibited. Then, when the anchor pin 103 descends to the position of the parallel rail groove portion 71b of the lock/slide rail 71, locking by the anchor pin 103 is released allowing the exertion of the compression forces of the respective coil springs 83 and 84, and the upper housing 51 performs sliding movement in such a manner as to trace the parallel rail groove portion 71b through the anchor pin 103. Thereby, the upper housing 51 is slidingly moved by substantially the half of the length in the length direction with respect to the lower housing 52, whereby the mobile phone is set the open state, as shown in FIG. 10B.

Thereby, the so-called one-push opening function can be implemented in such a simple manner that when, using his/her thumb or the like, the user just moves the lock button 54 of the mobile phone in the closed state along the lock release direction, then the upper housing 51 is driven to automatically slide along the opposite direction of the key operation section 53, thereby putting the mobile phone into the open state.

On the other hand, upon the sliding movement of the upper housing 51 along the open direction, the leg portion 91 of the key mount plate 64 performs sliding movement on the portions of the lock/slide rail 71 in the order as: the parallel rail groove portion 71b to the inclined rail groove portion 71c and then to the position-fixing rail groove portion 71d. Similarly, in synchronism with the sliding movement of the leg portion 91, also the leg portion 92 of the key mount plate 64 performs sliding movement on the portions of the other lock/slide rail 72 in the order as: the parallel rail groove portion 72a to the inclined rail groove portion 72b and then to the position-fixing rail groove portion 72c.

In accordance with the above, an end portion 51a on the side of the upper housing 51 shown in FIG. 10B is elevated by the position-fixing rail groove portions 71d and 72c, and the key mount plate 64 is fixed at a position wherein the end portion 53a reaches the same height as an end portion 51a of the upper housing 51 on the side of the key operation section 53. Thereby, similarly as in the case of the above-described mobile phone according to the first embodiment, a stepped portion can be prevented from occurring between the end portion 51a of the upper housing 51 and the end portion 53a of the key operation section 53, thereby enabling smooth input operation to be performed.

The lengths of the respective parallel rail groove portions 71*b* and 72*a* are set to cause the connection pins 100, which are provided in the respective leg portions 91 and 92 of the key mount plate 64, to reach the respective inclined rail groove portions 71*c* and 72*b* when the end portion 51*a* on the side of the upper housing 51 passes over the end portion 53*a* of the key operation section 53. As such, the key mount plate 64 is controlled to slowing ascend with a timing when the end portion 51*a* on the side of the upper housing 51 slidingly moves along the open direction passes over the end portion 53*a* of the key operation section 53.

In addition, according to the mobile phone of the second embodiment, when the open state is set, the respective leg portions 91 and 92 of the key mount plate 64 is supported by the position-fixing rail groove portions 71*d* and 72*c* of the lock/slide rail 71. Accordingly, the key mount plate 64 can be supported to provide sufficient durability against depression forces in the event of key operation.

(Speed Damping Control by Damper)

According to the mobile phone of the second embodiment, the respective coil springs 83 and 84 are expanded to set the closed state. On the other hand, the compression forces of the respective coil springs 83 and 84 are used by operating the lock button 54 and releasing the locking, whereby the sidewall portion 52 is driven to slide, and the open state is automatically set. As such, when the locking is released by the lock button 54, the sidewall portion 52 is driven to speedily slide by the compression forces of the respective coil springs 83 and 84. In the case of the mobile phone of the second embodiment, although no problems occur even in the above-described condition, the slide speed of the upper housing 52 is damped by the damper 80 to a moderate speed.

Figure 14:
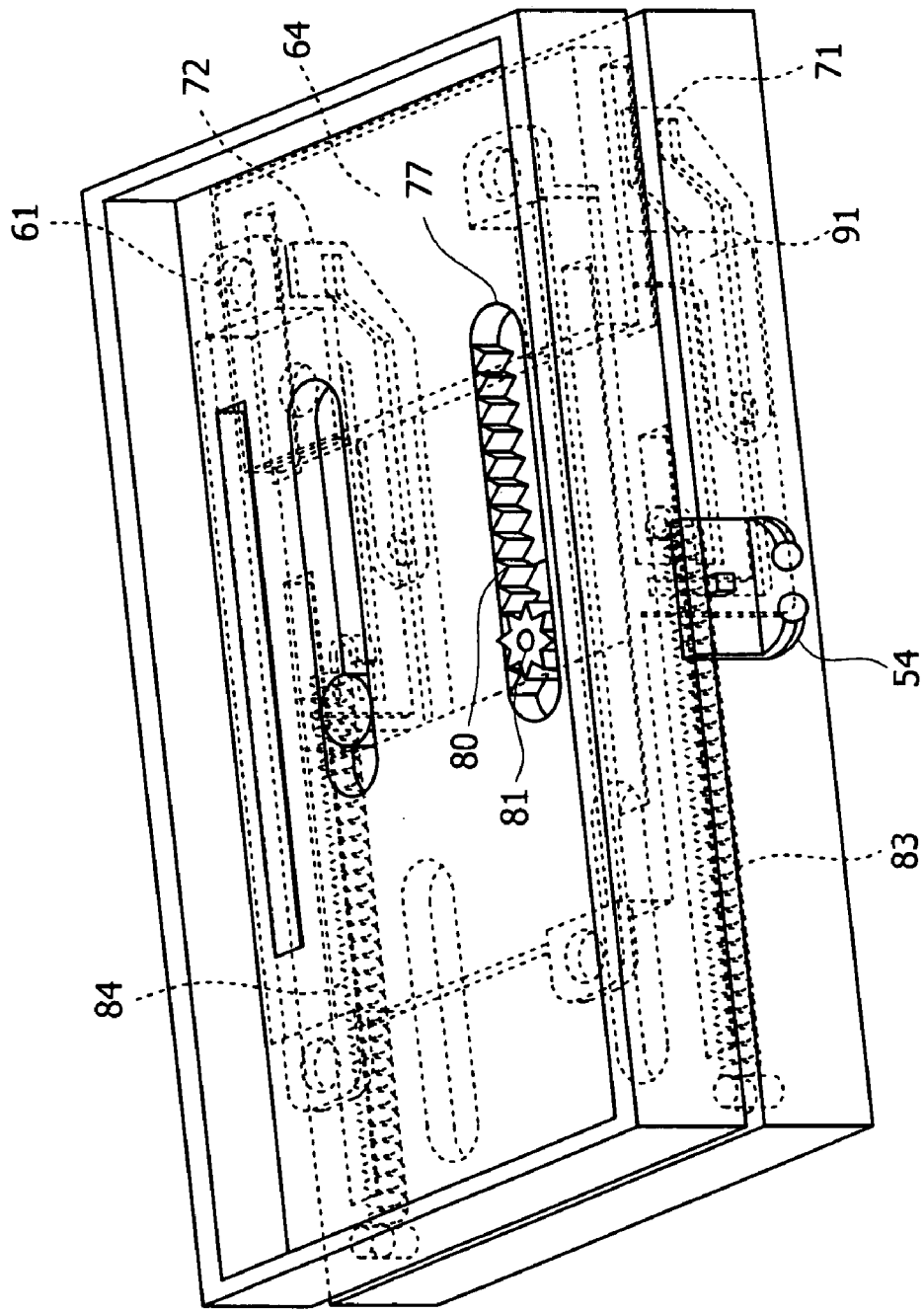
FIG. 14 is a damper provided on the lock/slide mechanism of the mobile phone in the closing event according to the second embodiment.

More specifically, in the case of the mobile phone, as shown in FIG. 14, the gear-dedicated rail groove portion 77 provided in the lower-half housing 62 of the upper housing 51 is engaged with the damper gear 81 of the damper 80 provided in the upper-half housing 63 of the lower housing 52.

Figure 15:
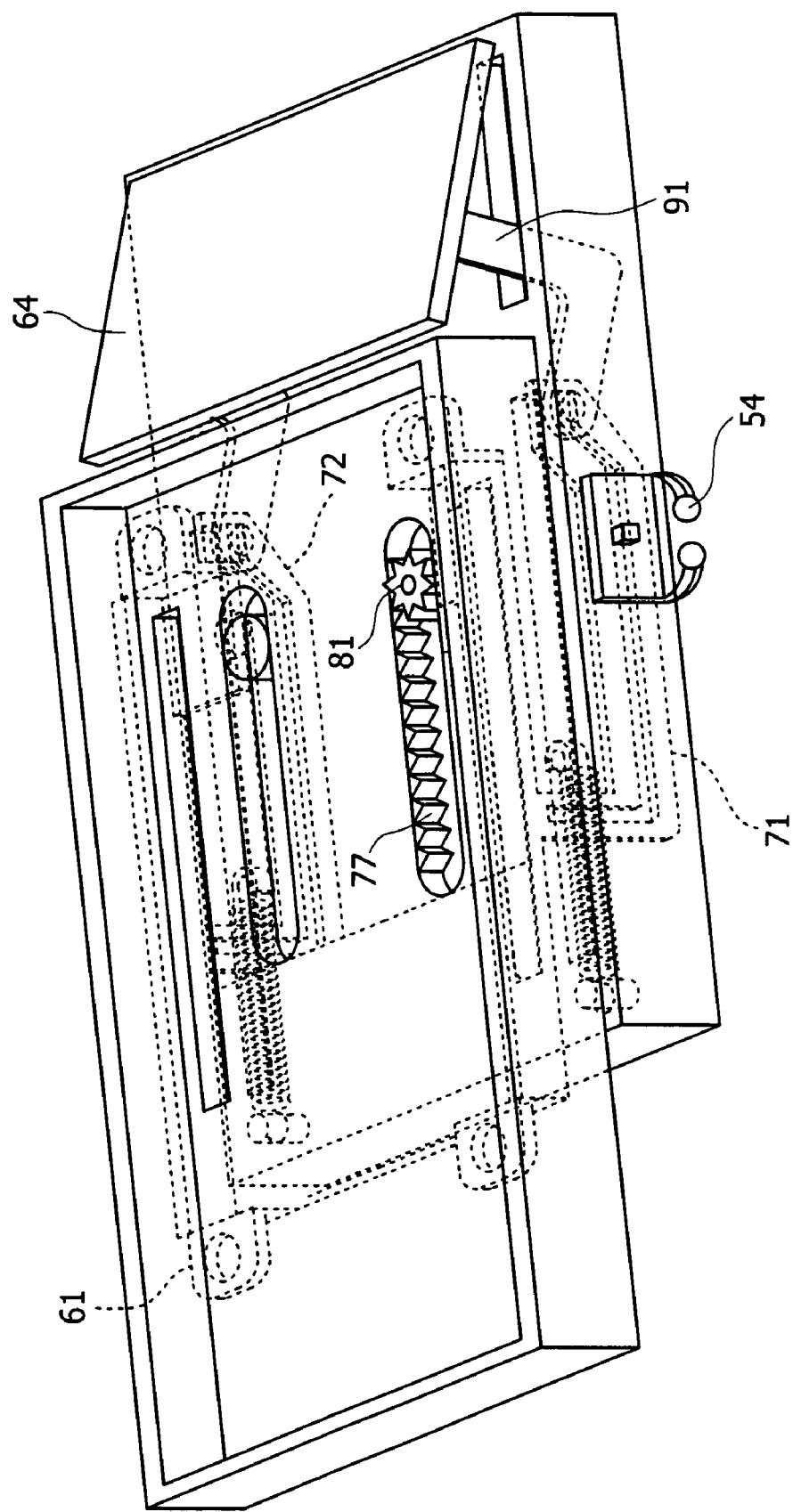
FIG. 15 is a damper provided on the lock/slide mechanism of the mobile phone in the opening event according to the second embodiment.

When locking is released by the lock button 54, and as shown in FIG. 15, the upper housing 52 is driven to slide in the open direction by the compression forces of the respective coil springs 83 and 84, the gear-dedicated rail groove portion 77 slides in synchronism with the sliding of the upper housing 52, thereby to rotate the damper gear 81 of the damper 80. While the present case is one example, the damper 80 (speed-damping member) is a hydraulic damper, whereby upon rotation of the damper gear 81, the rotational speed is damped to a moderate speed. Thereby, when locking is released by the lock button 54, the compression forces of the respective coil springs 83 and 84 are reduced to moderate levels, so that the upper housing 52 can be driven to slowly or gently slide. Consequently, the sliding operation of the upper housing 51 in the opening event can be performed as that having a sufficient margin in a visible aspect, therefore providing the impression of a high grade product.

(Operation in Closing Event)

When setting the mobile phone of the second embodiment to the closed state, the user puts, for example, his/her first finger, on an end portion of the upper housing 51 on the opposite side of the key operation section 53 of the mobile phone in the opening event shown in FIG. 10B, thereby to cause a sliding operation of the upper housing 51. As described above, the compression forces of the respective coil springs 83 and 84 act in the opening event of the mobile phone, so that in the closing event, a force is exerted onto the upper housing 51 to expand the respective coil springs 83 and 84, thereby to cause the upper housing 51 to perform the sliding operation to the close direction.

As a result of the sliding operation along the close direction, as shown in FIG. 13, the parallel rail groove portion 71*a* and parallel rail groove portion 71*b* of the lock/slide rail 71 are driven to slide along the anchor pin 103 of the lock button 54. When the lock-button dedicated rail groove portion 71*a* of the lock/slide rail 71 is driven to slide to the position of the anchor pin 103 of the lock button 54, the lock button 54 is pushed up by forces of extention of the extensible arms 54*a* along a locking direction shown in FIG. 12, whereby the anchor pin 103 enters the lock-button dedicated rail groove portion 71*a*.

Thereby, as described above, the anchor pin 103 of the lock button 54 is engaged with the lock-button dedicated rail groove portion 71*a*, compression forces of the respective coil springs 83 and 84 are inhibited, thereby to prevent the frame mechanism 61 from sliding along the open direction. In this manner, the mobile phone is set to the closed state.

On the other hand, upon the sliding movement of the upper housing 51 along the close direction, the leg portion 91 of the key mount plate 64 performs sliding movement on the portions of the lock/slide rail 71 in the order as: the position-fixing rail groove portion 71*d* to the inclined rail groove portion 71*c* and then to the parallel rail groove portion 71*b*. Similarly, in synchronism with the sliding movement of the leg portion 91, also the leg portion 92 of the key mount plate 64 performs sliding movement on the portions of the other lock/slide rail 72 in the order as: the position-fixing rail groove portion 72*c* to the inclined rail groove portion 72*b* and then to the parallel rail groove portion 72*a*.

In accordance with the above, the key mount plate 64 slidingly moves in the manner that the respective leg portions 91 and 92 descend along the inclined rail groove portions 71*c* and 72*b* and undergo descending control to slowly descend from substantially the same height as that of the end portion 51*a* on the side of the key operation section 53 of the upper housing 51 shown in FIG. 10B. When the respective leg portions 91 and 92 has undergone to positions of the respective parallel rail groove portions 71*b* and 72*a*, the key mount plate 64 is stored into the sidewall portion 52, as shown in FIG. 10A. Thereby, the key mount plate 64, which was subjected to the automatic ascending control in the opening event, can be automatically stored into the sidewall portion 52 in the closing event.

The lengths of the respective position-fixing rail groove portions 71*d* and 72*c* of the respective lock/slide rails 71 and 72 are set to be substantially sufficient to support the connection pins 100, which are provided in the respective leg portions 91 and 92 of the key mount plate 64. Upon exertion of the close direction force by the user, the connection pin 100 shifts from the respective position-fixing rail groove portions 71*d* and 72*c* with almost no time difference, and then moves along the inclined rail groove portions 71*c* and 72*b*. As such, when the close direction force is exerted, the descension of the key mount plate 64 starts with almost no time difference, and when the end portion 51*a* of the upper housing 51 reaches the position of the end portion 53*a* of the key operation section 53, the sidewall portion 52 is put into the state where it is substantially stored into the sidewall portion 52. Consequently, in the closing operation event, the inconvenience of causing the end portion 51*a* of the upper housing 51 to contact the end portion 53*a* of the key operation section 53 can be prevented, thereby making it possible to prevent the inconvenience of causing the mobile phone to be damaged by the contact.

EFFECTS/ADVANTAGES OF SECOND EMBODIMENT

As is evident from descriptions given above, according to the mobile phone of the second embodiment, the frame mechanism 61 to be stored into the upper housing 51 and the lower housing 52 are intercoupled through the respective coil springs 83 and 84, wherein the anchor pin 103 of the lock button 54 provided in the sidewall portion 52 is engaged with the lock-button dedicated rail groove portion 71a of the lock/slide rail 71 of the frame mechanism 61, and in the state where the respective coil springs 83 and 84 are expanded, the mobile phone is set to the closed state. In the opening event, lock button 54 is operated to move the anchor pin 103, which is engaged with the lock-button dedicated rail groove portion 71a, to the side of the parallel rail groove portion 71b of the lock/slide rail 71, whereby locking is released. Then, the compression forces of the respective coil springs 83 and 84 are used to drive the upper housing 52 to slide, whereby the mobile phone can automatically be set to the open state. This makes it possible to realize so-called one-touch operation.

Further, in accordance with the one-touch operation, when the upper housing 51 is slidingly moved to the open direction, the damper 80 is used to the compression forces of the respective coil springs 83 and 84 damped to the moderate level, whereby the upper housing 52 can be driven to slowly or gently slide. Consequently, the sliding operation of the upper housing 51 in the opening event can be performed as that having a sufficient margin in a visible aspect, therefore providing the impression of a high grade product.

In addition, as shown in FIG. 11, the lock/slide mechanism is provided to be completely stored into the upper and lower housings 51 and 52. As such, as shown in FIGS. 10A and 10B, the frame mechanism 61, the damper 80, and the like are not exposed to the outside of the housings 51 and 52. Consequently, except for the portion where the lock button 54 is provided, the overall surface section of upper and lower housings 51 and 52 can be a design object, and the range of design probability can be widened.

Further, in the mobile phone of the second embodiment, the ascending/descending control of the key mount plate 64 is performed in association with the sliding movement of the frame mechanism 61 in the opening and closing events of the mobile phone by using the inclined rail groove portions 71c and 72b provided to the respective lock/slide rails 71 and 72 of the frame mechanism 61.

As such, according to the second embodiment, the novel mobile phone can be provided wherein in the opening event, the upper housing 51 automatically slides along the open direction, and the key operation section 53 automatically ascends from the lower housing 52; and in the closing event, when the upper housing 51 is slidingly operated along the close direction, and the key operation section 53 automatically descends to be stored into the lower housing 52.

Further, according to the mobile phone of the second embodiment, a stepped portion does not occur between the end portion 51a of the upper housing 51 and the upper end portion 53a of the key operation section 53 (see FIG. 10B), smooth input operation can be performed.

Although the embodiments have each been described with reference to the case that the invention is adapted to the mobile phone, the invention may be adapted to other mobile terminal devices, such as PHS phones (personal handyphone systems), PDA devices (personal digital assistants), notebook personal computers, and electronic dictionary devices.

It is to be understood that each of the above-described embodiments is only an example of the invention. It is, therefore, apparent that the invention is not limited to the respective embodiment, and the invention may be adapted to other cases than the above-described embodiments, and various modifications and alterations maybe made corresponding to, for example, designs without departing from the technical concepts in accordance with the invention.

What is claimed is:

1. A mobile terminal device, comprising:
an upper housing;
a lower housing including a first outer face substantially covered by the upper housing after a closing event;
a key operation section mounted on a key mount plate and housed in the lower housing and configured to ascend through said first outer face in an opening event;
a slide mechanism interconnecting the upper housing and the lower housing and configured to slide along an open direction and a close direction, the open direction being a direction in which the key operation section, covered by the upper housing in the closing event, is exposed, and the close direction being a direction in which the key operation section, exposed in the opening event, is covered by the upper housing; and
an elevation mechanism mechanically coupled to the slide mechanism and configured to drive the key operation section to ascend from inside the lower housing in response to a force transferred to the elevation mechanism from a sliding movement of the slide mechanism in the open direction, and configured to drive the key operation section from an ascended state into the lower housing in response to a force transferred to the elevation mechanism from a sliding movement of the slide mechanism in the close direction, wherein
the elevation mechanism comprises
a support frame including a first spring anchor, the support frame pivotally connected to a first end of the key mount plate;
a first rotational connector including a second spring anchor, the first rotational connector pivotally connected to the support frame;
a spring anchored to the first spring anchor of the support frame and to the second spring anchor of the first rotational connector; and
a second rotational connector pivotally connected to the first rotational connector and pivotally connected to a second end of the key mount plate.

2. A mobile terminal device according to claim 1, further comprising a slide force exertion mechanism configured to exert through the slide mechanism forces onto the upper housing and the lower housing in the open direction.

3. A mobile terminal device according to claim 1, wherein in the opening event, the elevation mechanism drives the key operation section to ascend so that a height position of the key operation section and a height position of the upper housing are substantially the same.

4. The mobile terminal device according to claim 2, further comprising a slide force control mechanism configured to control the slide force exertion mechanism to exert the slide forces onto the upper housing and the lower housing in the open direction in the opening event, and to control the slide force exertion mechanism to exert the slide forces onto the upper housing and the lower housing in the close direction in the closing event.

5. The mobile terminal device according to claim 1, wherein the key operation section comprises:
   a top face; and
   a plurality of keys provided on the top face,
   wherein the top face is substantially parallel to the first surface of the lower housing after the closing event, and forms an acute angle relative to the first surface of the lower housing after the opening event.

6. The mobile terminal device according to claim 1, wherein the key operation section is sandwiched from two opposite sides by the upper housing and the lower hosing after the closing event.

7. The mobile terminal device according to claim 1, wherein the elevation mechanism is pivotally attached to the lower housing by an axle.

8. The mobile terminal device according to claim 7, wherein the elevation mechanism is configured to elevate one end of the key operation section while leaving another end of the key operation section substantially descended.

9. The mobile terminal device according to claim 1, wherein a surface of the lower housing forms a first outermost surface of the mobile terminal device and a surface of the upper housing forms a second outermost surface of the mobile terminal device, the first outermost surface and the second outermost surface lying in substantially parallel different planes.

10. The mobile terminal device according to claim 1, wherein the slide mechanism comprises:
   a rail mechanism including rail grooves and a first anchor pin, the rail mechanism in the lower housing;
   a slide pin mechanism fastened to the upper housing plate and slidably intercoupling the upper housing to the lower housing through the rail groves of the rail mechanism, the slide pin mechanism including a second anchor pin; and
   a spring member anchored to the first anchor pin and the second anchor pin.

11. The mobile terminal device according to claim 10, wherein
   the spring member exerts force on the rail mechanism and the slide pin mechanism in the open direction after the opening event, and
   the spring member exerts force on the rail mechanism and the slide pin mechanism in the close direction after the closing event.

12. The mobile terminal device according to claim 10, wherein the spring member is a torsion spring.

* * * * *